(12) United States Patent
Nguyen et al.

(10) Patent No.: US 7,966,561 B1
(45) Date of Patent: Jun. 21, 2011

(54) SYSTEM AND METHOD FOR INDICATING INFORMATION FLOW AMONG DOCUMENTS

(75) Inventors: Hiep Nguyen, Carrollton, TX (US);
Jennifer L. Reeves, Frisco, TX (US);
David N. Sterling, Carrollton, TX (US);
Sara D. Mattice, Farmersville, TX (US);
Laurie A. Irish-Duncan, Plano, TX (US); Albert S. Baines, Little Elm, TX (US); William W. Huckabee, Sachse, TX (US); Pamela R. Welch, Carrollton, TX (US)

(73) Assignee: Intuit Inc., Mountain View, CA (US)

( * ) Notice: Subject to any disclaimer, the term of this patent is extended or adjusted under 35 U.S.C. 154(b) by 964 days.

(21) Appl. No.: 11/488,813

(22) Filed: Jul. 18, 2006

(51) Int. Cl.
*G06F 17/00* (2006.01)
(52) U.S. Cl. ......... 715/277; 715/221; 715/224; 715/226
(58) Field of Classification Search ................. 715/277, 715/221, 224, 226; 705/1.1, 19
See application file for complete search history.

(56) References Cited

U.S. PATENT DOCUMENTS

| | | | |
|---|---|---|---|
| 6,353,817 B1 * | 3/2002 | Jacobs et al. | 706/50 |
| 6,647,156 B1 * | 11/2003 | Meding | 382/305 |
| 7,778,895 B1 * | 8/2010 | Baxter et al. | 705/31 |
| 2002/0091602 A1 * | 7/2002 | Stern et al. | 705/35 |
| 2003/0036912 A1 | 2/2003 | Sobotta et al. | |
| 2003/0078960 A1 * | 4/2003 | Murren et al. | 709/203 |
| 2004/0196493 A1 * | 10/2004 | Christiansen et al. | 358/1.15 |
| 2005/0171881 A1 * | 8/2005 | Ghassemieh et al. | 705/35 |
| 2006/0155632 A1 | 7/2006 | Cherkas et al. | |
| 2006/0178961 A1 * | 8/2006 | Stanley et al. | 705/31 |
| 2007/0033117 A1 | 2/2007 | Murray | |
| 2010/0070394 A1 * | 3/2010 | Wyle | 705/31 |

* cited by examiner

*Primary Examiner* — Chau Nguyen
(74) *Attorney, Agent, or Firm* — Osha • Liang LLP

(57) ABSTRACT

System and method for accessing and displaying information related to information flow and relationships among various electronic tax or financial documents presented by tax programs or other types of financial return preparation programs. A mechanism or mechanisms may enable users to view information related to the flow of information among electronic documents in a tax program starting at the level of a field or a document, or alternatively starting at a high-level outline view or summary of the tax preparation process or a portion thereof. These mechanism(s) may enable a preparer or other user to access graphical and/or textual displays of information related to values in fields of electronic tax or financial documents presented by tax programs and in other types of financial return preparation programs and of the relationships among fields and documents in the tax or financial return preparation process.

21 Claims, 14 Drawing Sheets

```
            Tax Summary
         John and Jane Smith
              INCOME

Wages, salaries, tips, etc . . . . . . . . . . 125,000
Interest income . . . . . . . . . . . . . . . . . . . 2,345

Dividend income

Dividend 1 . . . . . . . . . . . . . . 4,000
        Dividend 2 . . . . . . . . . . . . . . 8,000
        Dividend 3 . . . . . . . . . . . . . . . 450

Total . . . . . . . . . . . . . . . . . . 12,450

Business income . . . . . . . . . . . . . . . . 23,845
Capital gain or loss . . . . . . . . . . . . . . 10,567

Total income . . . . . . . . . . . . . . . . . . . 174,207

Home

View 400
```

*FIG. 6C*

```
            Tax Summary
         John and Jane Smith
              INCOME

Wages, salaries, tips, etc . . . . . . . . . . . . . 125,000
Interest income . . . . . . . . . . . . . . . . . . . . . . 2,345
Dividend income . . . . . . . . . . . . . . . . . . . . 12,450

Business income

Business 1 . . . . . . . . . . . . . . 12,225
        Business 2 . . . . . . . . . . . . . . 11,620

Total . . . . . . . . . . . . . . . . . . 23,845

Capital gain or loss . . . . . . . . . . . . . . . . 10,567

Total income . . . . . . . . . . . . . . . . . . . . . 174,207

Home

View 400
```

*FIG. 6D*

Tax Summary
John and Jane Smith
INCOME

Wages, salaries, tips, etc . . . . . . . . . . . . . .125,000
Interest income . . . . . . . . . . . . . . . . . . . . . . . . .2,345
Dividend income . . . . . . . . . . . . . . . . . . . .12,450

Business income

Business 1 . . . . . . . . . . . . . .12,225
        Tax document 1
        Tax document 2

Business 2 . . . . . . . . . . . . . .11,620

Total . . . . . . . . . . . . . . . . . . . . . . .23,845

Capital gain or loss . . . . . . . . . . . . . . . . . .10,567

Total income . . . . . . . . . . . . . . . . . . . . . . . 174,207

Home

View 400

*FIG. 6E*

Tax Summary
John and Jane Smith
INCOME

Tax document 1 (amount)
Tax document 2 (amount)

Wages, salaries . . . . . . . . . . . . . . . . . . . . 125,000
Interest income . . . . . Hover box 460 . . . 2,345
Dividend income . . . . . . . . . . . . . . . . . . . .12,450
Business income . . . . . . . . . . . . . . . . . .23,845
Capital gain or loss . . . . . . . . . . . . . . . . 10,567

Total income . . . . . . . . . . . . . . . . . . . . . . . 174,207

View 400

*FIG. 6F*

SYSTEM AND METHOD FOR INDICATING INFORMATION FLOW AMONG DOCUMENTS

BACKGROUND

Tax preparation software programs (hereinafter referred to as "tax programs") are available from various vendors that assist users in preparing accurate Federal and/or State income tax returns and other tax forms. These tax programs guide the user through State and/or Federal tax return processes step-by-step, and may automatically perform necessary tax preparations in accordance with user-entered data input, forms, schedules, and tax data, tables, and formulas stored with or coded into the program. Personal and/or business tax programs may be provided. In addition, both personal and professional versions of these programs may be offered. Professional versions may be used by tax preparation professionals to prepare various tax returns for multiple customers. Further, these tax programs may be used to prepare annual taxes, quarterly taxes, etc.

Tax programs typically include tax documents—the various forms, schedules, worksheets, etc. needed to prepare and file tax returns. For example, Federal tax return forms that may be provided may include, but are not limited to, 1040, 1040A, 1040EZ, 1040NR, and 1040X forms. In addition, various tax forms and schedules for various States may be included. These tax documents may be graphically presented by the tax program to the tax preparer on a display device (e.g., a computer monitor). Typically, a tax program will provide a user interface with various user interface mechanisms (menus, dialog boxes, etc.) and user-selectable interface items (menu items, buttons, controls, text entry boxes, etc.) whereby the preparer may access the documents as needed and enter and/or modify data on the various tax documents using one or more data entry/cursor control mechanisms, such as a keyboard and mouse. Typically, these documents are presented on the user interface as templates that, when partially or completely filled out, may be "saved" for the particular taxable entity for which the documents are prepared.

Instead of or as an alternative to entering the necessary data and information directly to the electronic tax return documents (e.g., directly to a 1040 form), some implementations of tax programs may provide an input mechanism whereby the user inputs the necessary data and information into input fields on data entry displays presented to the user by the tax program. Data and information entered by the user via the input fields may then be automatically transferred into the appropriate locations on the tax return documents. The tax program may perform any necessary calculations using the entered data and information, and possibly data and information from other sources such as previous tax returns, to generate appropriate calculated values for certain fields of the tax return documents.

Typically, the preparer will enter necessary data and information to the documents via the user interface, and, when done, access the user interface to direct the tax program to complete the preparation of the tax documents. In some cases, historical tax return information or data for the user (e.g., tax return information or data from a previous year) may be used in preparation of a current tax return. In addition, some tax return information or data may be transferred from one current form to another current form. For example, information or data from a current Federal 1040 form may be transferred to a current State tax return form. Note that some fields on the tax return documents may include values that are calculated by the tax program from entered and/or transferred data in accordance with various formulas for calculating the fields applied by the tax program.

SUMMARY

Various embodiments of a system and method for accessing and displaying information related to information flow and relationships among various electronic tax documents presented by tax preparation software programs (hereinafter referred to as tax programs) are described. Tax programs may guide the user through income, property, sales, or other type of tax return processes for a governmental entity (e.g., Federal, State, county, city, district, or other municipality) step-by-step, and may automatically perform necessary tax preparations in accordance with user-entered data input, forms, schedules, and tax data, tables, and formulas stored with or coded into the program.

Embodiments may provide a mechanism or mechanisms that enable users to view information related to the flow of information among electronic documents in a tax program and in other types of financial return preparation programs. These mechanism(s) may enable a preparer or other user to access graphical and/or textual displays of information related to values in fields of electronic tax documents presented by tax programs and in other types of financial return preparation programs. The displayed information may include, but is not limited to, information pertaining to sources of the values in fields (e.g., other electronic documents and/or fields on other electronic documents from which values are used to calculate the value in a currently displayed field) and/or destinations of the values in fields (e.g., other electronic documents and/or fields on other electronic documents that use the value in the currently displayed field as a source value). In addition, information related to formulas or calculations used in the generation of the values may be displayed. In some embodiments, links to help or other information for at least some fields and/or documents may be provided.

One embodiment may provide a user interface mechanism for accessing and displaying the flow of information to and from fields in a current tax document in a tax program. Using this mechanism, a user may proceed from the level of a selected field in an electronic tax document to view information on other documents and fields from which data flows into or out of the selected field, in popup boxes or other user interface elements. One embodiment may provide a user interface mechanism for accessing and displaying the flow of information to and from a current tax document, rather that to and from a field, in a tax program. In this mechanism, a graphical or textual representation of a current tax document, for example a "thumbnail", may be displayed as a user interface item on a view or other such user interface element. In addition, one or more user interface items may be displayed as graphical or textual representations of one or more source tax documents for the current tax document, and one or more user interface items may be displayed as graphical or textual representations of one or more destination tax documents for the current tax document. In one embodiment, hovering the cursor over or otherwise selecting an interface item representing a source tax document or destination tax document may cause a hover box or other user interface element to be displayed that includes additional information related to the selected document as a source or destination for one or more values in document.

In one embodiment, as an alternative to the mechanisms described above, a mechanism that provides what may be described as a high-level "flow chart" approach to viewing the flow of information among electronic documents in a tax program may be provided. In this mechanism, a tax summary outline view may be presented that includes exemplary user interface mechanisms and elements for accessing and displaying relationships among and information flow between tax documents in a tax return prepared by an implementation of a tax program.

While embodiments are generally described herein in reference to tax preparation software programs, embodiments may be implemented for other types of computer-implemented processes, programs, and applications, including but not limited to other types of financial software programs.

BRIEF DESCRIPTION OF THE DRAWINGS

FIGS. 6A through 6F illustrate an exemplary view including exemplary user interface mechanisms and elements for accessing and displaying relationships among tax documents in a tax program according to one embodiment.

Figure 1:
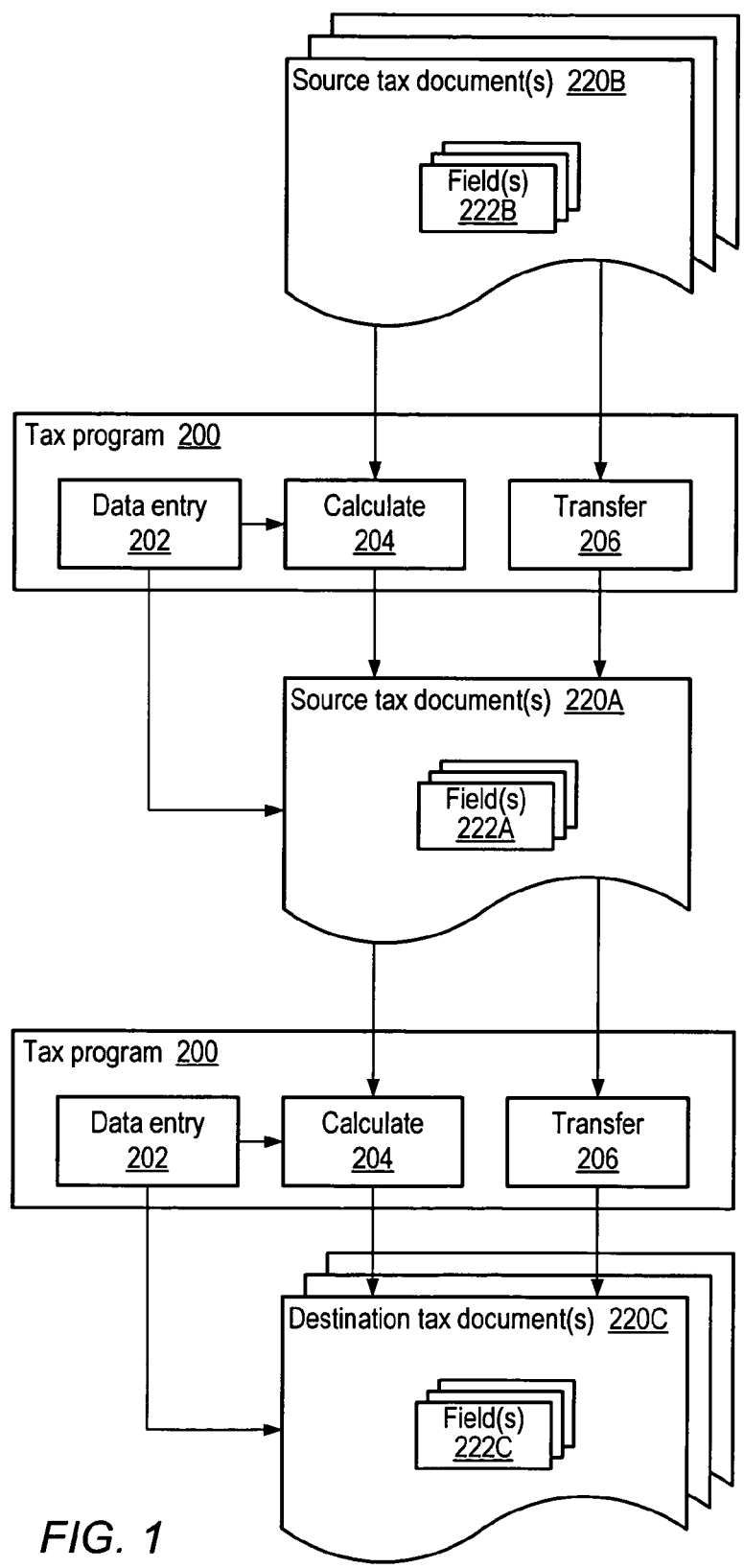
FIG. 1 illustrates data flow to and from electronic tax documents in a tax program according to one embodiment.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Various embodiments of a system and method for accessing and displaying information related to information flow and relationships among various electronic tax documents presented by tax preparation software programs (hereinafter referred to as tax programs) are described. Tax programs may guide the user through income, property, sales, or other type of tax return processes for a governmental entity (e.g., Federal, State, county, city, district, or other municipality) step-by-step, and may automatically perform necessary tax preparations in accordance with user-entered data input, forms, schedules, and tax data, tables, and formulas stored with or coded into the program.

Note that tax returns may be part of a broader class of financial returns. Financial returns may be defined as sets of one or more documents that may be prepared according to the requirements or at the request of some governmental entity for a specified reporting period. Note that financial returns may be tax or tax-related returns, or informational returns that are required for reporting purposes but that do not result in or require the payment of any actual taxes. Examples of informational returns may include, but are not limited to, partnership returns and benefit plan returns. Thus, tax programs may be classified as a type of, or function or module of, financial return preparation programs. Therefore, it is important to note that "tax program" is used herein as an example of the broader class of financial return preparation programs, and "tax return" is used herein as an example of the broader class of financial returns. Thus, the system and method as described herein may be more generally applied for information and data related to fields in electronic financial documents presented by financial return preparation programs, with tax programs and tax return preparation given as an example of a specific application of the system and method.

Note that electronic documents of a tax return may be referred to herein as "tax electronic documents" or simply as "electronic documents." Electronic documents of a current tax return may be referred to as "current tax electronic documents" or in some cases "current tax documents", and electronic documents of a previous tax return may be referred to as "previous tax electronic documents" or in some cases "previous tax documents." Further note that electronic documents of a tax return as described herein are intended to include both tax return documents (e.g., 1040, 1040A, 1040EZ, 1040NR, and 1040X forms of a Federal tax return) and data entry displays that include input fields for entering data and information to be transferred into tax return documents. Further, note that electronic documents as used herein may also include other types of electronic documents used in the preparation of tax returns, including but not limited to other electronic documents that are or were used as sources for data and/or information in current or previous tax returns. An example would be an electronic W-2 Form, but other financial and non-financial electronic documents may also be used as source documents for preparing tax returns, and are also intended to be included.

As previously mentioned, instead of or as an alternative to entering the necessary data and information directly to the tax return documents (e.g., directly to a 1040 form), some implementations of tax programs may provide an input mechanism whereby the user inputs necessary data and information into input fields on data entry displays presented to the user by the tax program. Note that data and/or information from other sources, including data and/or information from a previous tax return, may be transferred into or used in the calculation of values for some fields in the data entry displays. Data and information from the data entry displays may then be automatically transferred into the appropriate locations on the tax return documents. The tax program may perform any necessary calculations using the data and information from the data entry displays, and possibly data and information from other sources such as previous tax returns, to generate appropriate calculated values for certain fields of the tax return documents.

In some cases, historical tax return information or data (e.g., tax return information or data from a previous year or previous quarter) for a person, business, or other entity (hereinafter referred to collectively as taxable entities) may be used in the preparation of electronic documents of a current tax return, and some of this information or data may be transferred into electronic documents of a current tax return, or used in the calculation of values in one or more fields of an electronic document of a current tax return. For example, information or data from a prior-year 1040 form may be transferred to an electronic documents of a current tax return. The information or data that may be transferred may include information for the taxable entity for whom the form is being prepared, e.g. name, address, employment information, dependents, etc., and data values from various fields of the tax return forms, e.g. the prior year's gross or net income from various sources, total taxes, data on assets or liabilities, information on capital gains or losses, depreciation, etc. Note that a similar transfer process may be used for persons, businesses or other entities for which tax returns may be prepared. Some conventional tax programs may be configured to automatically transfer at least some of the needed information or data for a taxable entity to current tax return electronic documents from previous tax return information or data prepared and stored by a previous version of the tax program.

In addition, at least some tax return information or data may be transferred from one current electronic tax document to another current electronic tax document. For example, information or data from a current Federal 1040 form may be transferred to a current State tax return form. Note that at least some fields on a tax return document may include values that are calculated by the tax program from entered and/or transferred data from other electronic tax documents in accordance with various formulas for calculating the fields applied by the tax program. For example, in implementations of tax programs that provide an input mechanism whereby the user inputs necessary data and information into input fields on data entry displays presented to the user by the tax program, values entered into the data entry displays may be transferred to and/or used in the calculations of values for fields on other data entry displays and/or on electronic tax return documents.

Therefore, a value in a field on any electronic document or data entry display in a tax program may be transferred or derived from values in one or more fields on one or more other electronic documents or data entry displays, and the value may be calculated in accordance with a formula typically not displayed and generally not known to the user of the tax program. In addition, a value in a field on any electronic document or data entry display may itself be used as a source value for one or more fields on the same electronic document and/or one or more other electronic documents or data entry displays. Thus, the data used in the preparation of tax returns in a tax program may be viewed as "flowing" through the tax return process, with one or more sources for, and possibly one or more destinations for, a value presented to the user in any one field of an electronic tax document.

A preparer (or taxable entity, if not the same person) may have questions as to where certain data or information displayed in a current tax electronic document was sourced from, as to how a value in a field on a current electronic tax document was calculated, and/or as to where else in the tax preparation process a value in a field may be used or transferred, or other question related to the flow of information through tax documents. Conventionally, the preparer would have to perform manual research to answer these questions. Often, the preparer would call or otherwise contact the provider of the tax program for assistance.

Embodiments may provide a mechanism or mechanisms that enable users to view information related to the flow of information among electronic documents in a tax program and in other types of financial return preparation programs. These mechanism(s) may enable a preparer or other user to access graphical and/or textual displays of information related to values in fields of electronic tax documents presented by tax programs and in other types of financial return preparation programs. The displayed information may include, but is not limited to, information pertaining to sources of the values in fields (e.g., other electronic documents and/or fields on other electronic documents from which values are used to calculate the value in a currently displayed field) and/or destinations of the values in fields (e.g., other electronic documents and/or fields on other electronic documents that use the value in the currently displayed field as a source value). In addition, information related to formulas or calculations used in the generation of the values may be displayed.

FIG. 1 illustrates information flow to and from electronic tax documents in a tax program according to one embodiment. FIG. 1 shows how information and data may flow from one or more source tax documents 220B to a current tax document 220A, and from tax document 220A to one or more destination tax documents 220C, in tax program 200. Note that tax documents 220 are intended to be representative of tax return documents (e.g., 1040, 1040A, 1040EZ, 1040NR, and 1040X forms of a Federal tax return), which in some implementations of a tax program may be presented as templates for data entry by the user, data entry displays that include input fields for entering data and information to be transferred into tax return documents, or any other type of source or destination electronic document that may be used in a tax program or other type of financial return preparation program. Further node that "current tax document" as used herein refers to any electronic tax document that is of current interest to and/or that is currently displayed by tax program 200 for a user. The current tax document 220A may be a tax document 220 currently under preparation by a preparer or a previously prepared tax document being viewed by the user.

Figure 7:
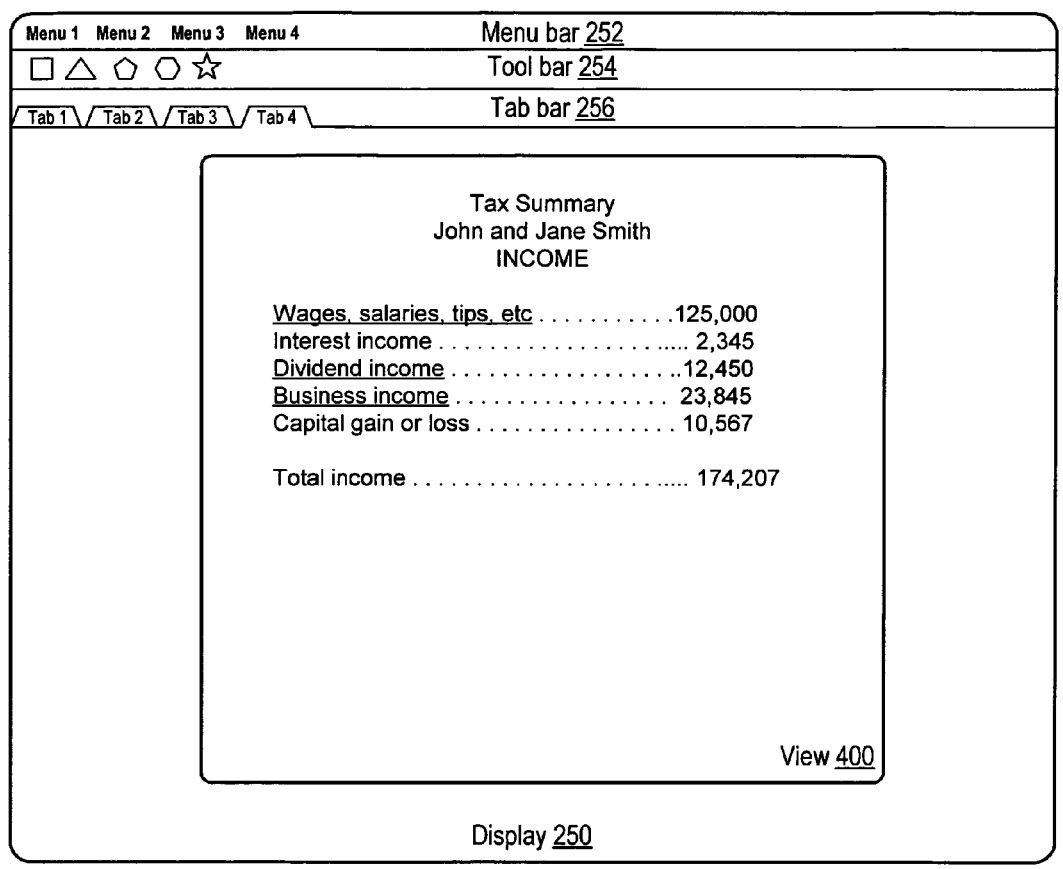
FIG. 7 illustrates the exemplary view of FIGS. 6A through 6F presented in an exemplary display and user interface that may be provided by a tax program according to one embodiment.

An instance of tax program 200 may be installed and executed on a computer system. The computer system may typically be, but is not limited to, a personal computer (PC) such as a desktop computer, laptop, or notebook computer. An exemplary computer system is illustrated in FIG. 7. Alternatively, tax program 200 may be a network- or web-based tax return preparation program, in which users may prepare various tax forms via a connection to a remote computer system (e.g., a server), without necessarily installing a tax program on their local computer systems (such as a personal computer or laptop).

A preparer may execute tax program 200 to prepare a current tax return for a taxable entity. The taxable entity may be the preparer, or may be another taxable entity for which the preparer is preparing the tax return. Note that the taxable entity may be a person, a business; or other entity for which a tax return is to be prepared. Further note that tax program 200 may be a personal or professional version. Professional versions may be used by tax preparation professionals to prepare various tax returns for multiple customers. Further note that the current tax return being prepared may be associated with a particular module (e.g., 1040 federal returns, individual state returns, 1120 federal, corporate state returns, etc.) in the tax program. Thus, the tax program may provide a user interface that allows the preparer to select an appropriate module.

Upon initiation of preparation of a current tax return for a taxable entity, the tax program 200 may provide a mechanism or mechanisms via which at least a portion of previous tax return information or data, or tax-related information or data from one or more other sources, may be accessed and transferred 206 for use in relevant places of the current tax return that is being prepared. Note that information or data that may be transferred may include textual information, such as the taxable entity's name, address, and other similar information, data values that were entered into, transferred into, or calculated using a previous tax program, or information and data values obtained from other sources, such as electronic W-2 forms.

Tax program 200 may provide a user interface to guide or step the preparer through one or more tax documents 220 (e.g. forms, worksheets, schedules, data entry displays, etc) to prepare the current tax return. Typically, a tax return involves the preparation of several electronic tax documents, and thus the tax preparation process can be quite complex. In some implementations, these electronic documents may be presented to the preparer as templates on a display device, and the tax program 200 may provide a data entry mechanism 202 via a user interface that allows the preparer to enter and/or modify data and information in various fields of the electronic tax documents 220. In addition, one or more of the values from previous tax return information and/or other sources may be transferred into or used in the calculation 204 of values for fields 222 of electronic tax documents 220. Further, values from a field or fields 220 on one or more electronic tax documents 220 may be transferred 206 to other electronic tax documents 220. For example, a calculated value from a worksheet or form may be transferred into a field 220 on another electronic tax document 220.

Instead of or as an alternative to entering the necessary data and information directly to the tax documents 220 (e.g., directly to a 1040 form), some implementations of tax program 200 may provide an input mechanism whereby the user inputs necessary data and information into input fields 222 on data entry displays presented to the user by the tax program as electronic tax documents 220. Note that data and/or information from other sources, which may include but is not limited to data and/or information from a previous tax return, from other data entry displays, or from other electronic tax documents related to the preparation of the current tax return, may be transferred into or used in the calculation of values for some fields 222 in the data entry displays. Data and information from the data entry displays may then be automatically transferred into the appropriate locations on electronic tax return documents 220 (e.g., onto an electronic 1040 form) and/or onto other data entry displays. The tax program 200 may perform any necessary calculations using the data and information from the data entry displays, and possibly data and information from other sources such as previous tax returns, to generate appropriate calculated values for certain fields 222 of the tax return documents 220.

In addition to preparer-entered or transferred values, tax program 200 may perform various calculations to generate values for some fields 222 in electronic tax documents 220. Note that inputs to a particular calculation to generate a value for a field 222 may include one or more values from one or more sources. One or more data values entered by the preparer via the data entry user interface may be used in calculations to generate new values from some fields 222 in electronic tax documents 220. In some cases, one or more values from previous tax return information may be used in calculations to generate new values for some fields. For example, a calculation may be performed that uses just one value from previous tax return information or one entered value as input. As another example, a calculation may be performed that uses two or more values from previous tax return information, two or more entered values, or combinations thereof. As another example, a calculation may be performed that uses one or more values from previous tax return information and one or more values entered by the preparer through the data entry user interface. In addition, calculated values or values from fields 222 on electronic tax documents 220 may be used as input into other calculations. Also note that some values used in calculations may be coded as "constants" into the tax program, or alternatively may be read into the tax program from a stored data file as needed.

Before, during or after preparation of a tax return or a particular electronic document of a tax return, a preparer (or taxable entity, if not the same person) may have questions related to the flow of information from or to a current electronic document 220A in tax program 200. For example, a preparer may have questions as to where certain data or information displayed in an electronic tax documents 220 came from or as to how a value in a field 222 was calculated. Conventionally, the preparer or other user would have to perform manual research to answer these questions. Often, the user would call or otherwise contact the provider of the tax program for assistance. Embodiments may provide a mechanism or mechanisms that enable users to access and view information related to the flow of information among electronic documents in a tax program and in other types of financial return preparation programs. The mechanism(s) may enable a preparer or other user to access graphical and/or textual displays of information (e.g., source and destination documents) related to values in fields of electronic tax documents presented by tax programs and in other types of financial return preparation programs.

Figure 2:
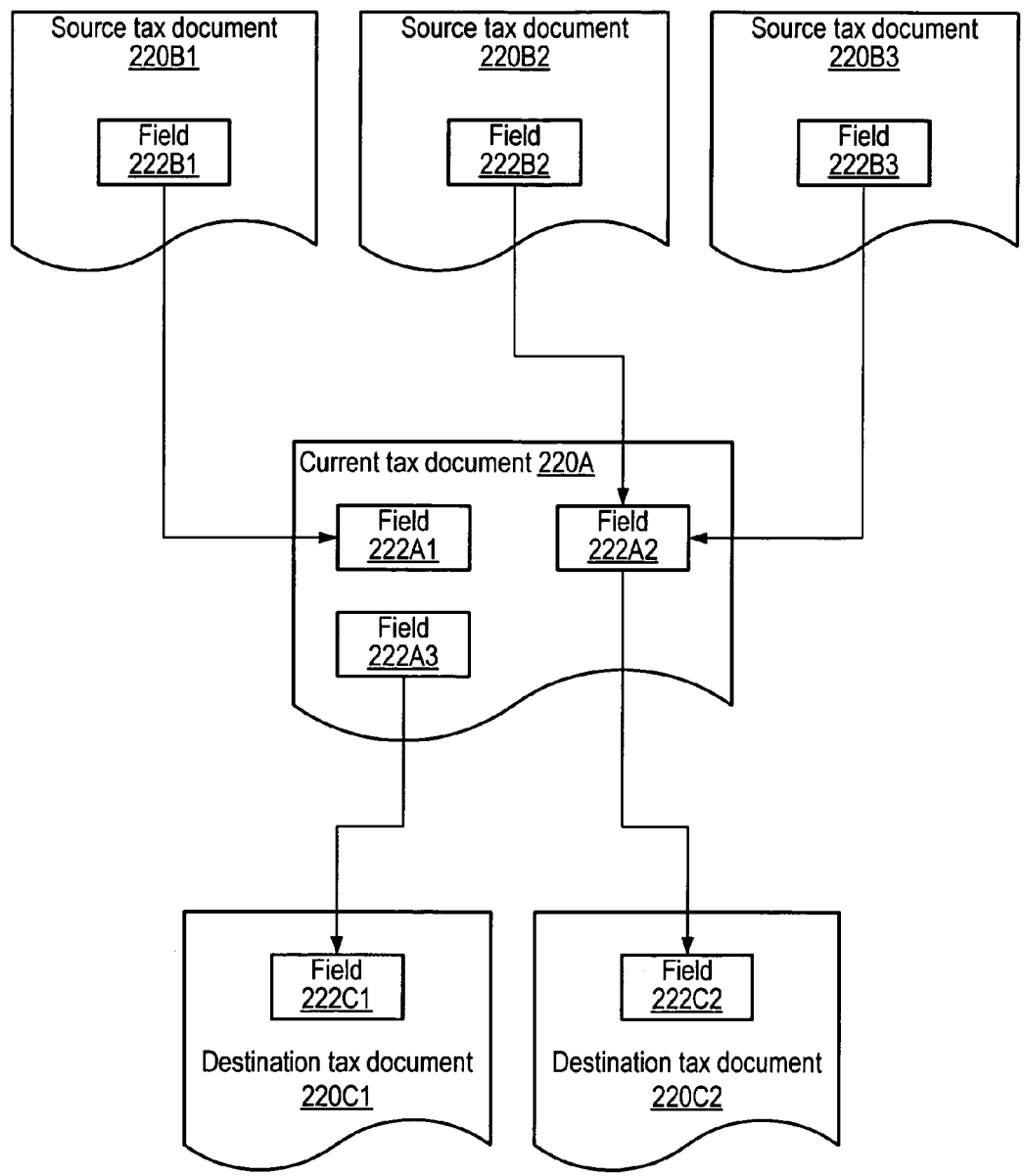
FIG. 2 illustrates data flow to and from fields on electronic tax documents in a tax program according to one embodiment.

FIG. 2 illustrates information flow to and from fields on electronic tax documents in a tax program according to one embodiment. FIG. 2 is provided to illustrate how values may flow from one or more fields 222B in one or more source tax documents 220B to one or more fields 222A in a current tax document 220A, and from one or more fields 222A in current tax document 220A to one or more fields 222C in one or more destination tax documents 220C, in a tax program 200. Note that tax documents 220 are intended to be representative of tax return documents, data entry displays that include input fields for entering data and information to be transferred into tax return documents, or any other type of source or destination electronic document that may be used in a tax program or other type of financial return preparation program.

In FIG. 2, field 222B1 on source tax document 220B1 flows into (i.e., is transferred into or used in the calculation of) field 222A1 on current tax document 220A. Field 222B2 on source tax document 220B2 and field 222B3 on source tax document 220B3 flow into (i.e., are used in the calculation of) field 222A2 on current tax document 220A. Field 222A3 on current tax document 220A flows into (i.e., is transferred into or used in the calculation of) field 222C1 on destination tax document 220C1, and field 222A2 on current tax document 220A flows into (i.e., is transferred into or used in the calculation of) field 222C2 on destination tax document 220C2.

Embodiments may provide a mechanism or mechanisms that enable users to view information related to the flow of information among electronic documents in a tax program such as the electronic documents 220 illustrated in FIGS. 1 and 2, and in other types of financial return preparation programs. These mechanism(s) may enable a preparer or other user to access graphical and/or textual displays of information related to values in fields 222 of electronic tax documents 220. Exemplary implementation of these mechanisms are presented in FIG. 3A through 3D, FIGS. 4A through 4D, and FIG. 5. Note that a tax program is used by way of example; embodiments may be implemented in other types of financial return preparation programs. Further note that tax documents 220 as illustrated in the following Figures are intended to be representative of tax return documents, data entry displays that include input fields for entering data and information to be transferred into tax return documents, or any other type of source or destination electronic document that may be used in a tax program or other type of financial return preparation program.

Figure 3A:
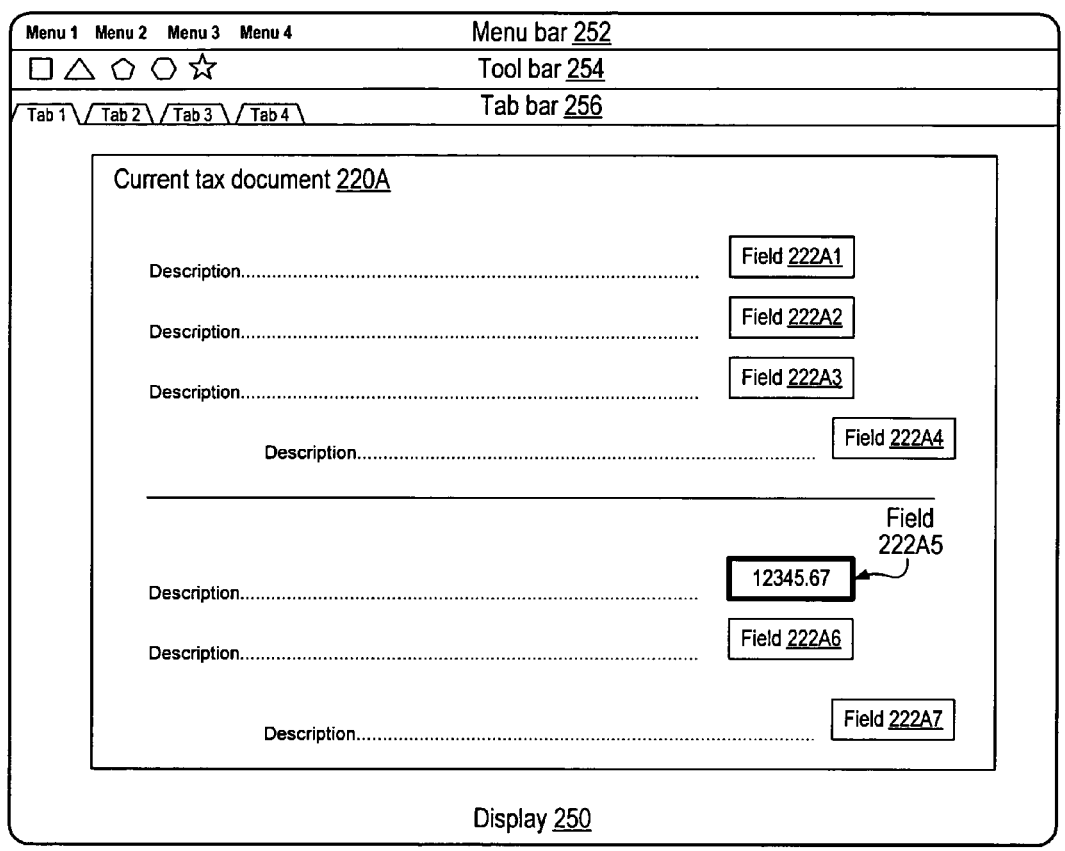
FIGS. 3A through 3D illustrate an exemplary display and user interface that may be provided by a tax program and that includes exemplary user interface mechanisms and elements that may be provided for accessing and displaying the flow of information to and from electronic tax documents according to one embodiment.

FIGS. 3A through 3D illustrate an exemplary display and user interface that may be provided by a tax program and that includes exemplary user interface mechanisms and elements that may be provided for accessing and displaying the flow of information to and from fields in electronic tax documents according to one embodiment. In FIG. 3A, display 250 may include one or more of, but is not limited to, a menu bar 252, a tool bar 254, and a tab bar 256. Menu bar 252 may provide one or more menus for accessing various functionalities of tax program 200 via user-selectable interface items (menu selections). Tool bar 254 may provide one or more tool icons for accessing various tools of tax program 200. Tab bar 256 may provide one or more tabs for switching between various views presented to the tax preparer. The currently selected tab displays a current tax document 220A.

Current tax document 220A may include multiple fields 222. Values in these fields 222 may include values entered by the preparer via the user interface, values transferred from another electronic tax document 220, or calculated values. A calculated value in a field 222 may be calculated from one or more other values from fields on various electronic documents including, but not limited to, values from other fields 222 on current tax document 220A, values from a previous tax return document, and values from a different electronic document 220 of the current tax return.

When preparing an electronic document such as document 220A, the preparer may have questions as to where a certain value displayed in one of the fields 222 came from and/or as to where the value may be elsewhere used. The description of the field 222 may provide some information, but may not provide enough information to satisfy the preparer. As an example, FIG. 2A illustrates field 222A5 of current tax document 220A filled in with a value (12345.67 is used as an exemplary value). If the value in field 222A5 was automatically filled in by the tax program 200, the preparer may be curious as to where the value "12345.67" came from, or as to where else the value may be used.

Thus, embodiments may provide one or more user interface mechanisms and elements whereby the preparer or other user may select a field 222A of a current tax document 220A and direct the tax program 200 to access and display information related to the flow of values into and/or out of the selected field 222A in the tax program. FIGS. 3A through 3D illustrate exemplary user interface mechanisms and elements that may be provided for accessing and displaying previous tax return information for field 222A5 of document 220A (or for other fields 222 in document 220A or on other electronic tax documents 220) according to various embodiments. Note that the user interface mechanisms and elements as illustrated and described are exemplary and are not intended to be limiting, and various modifications to or variations of the mechanisms and elements are possible, as are alternative user interface mechanisms and elements that are configured to perform similar functions.

In FIG. 3A, the preparer (or other user) has selected field 222A5, and the selection of field 222A5 is illustrated as highlighted by a bold outline or border. One of ordinary skill in the art will recognize that various user interface mechanisms for selecting a field in a document may be used. For example, a preparer may select a field by simply "hovering" the cursor over a desired field, such as field 222A5, using a mouse or other cursor control device. As another example, a mouse or other cursor control device may be used to select a field, for example by moving the cursor to the field and left- or right-clicking on the field. As yet another example, a preparer may select a field by using a tab or enter key on a keyboard to go to the field. One of ordinary skill in the art will also recognize that various other user interface methods for highlighting a selected field in a document than bolding an outline or border may be used. Note also that highlighting a selected field 222A5 is optional and implementation-dependent.

Figure 3B:
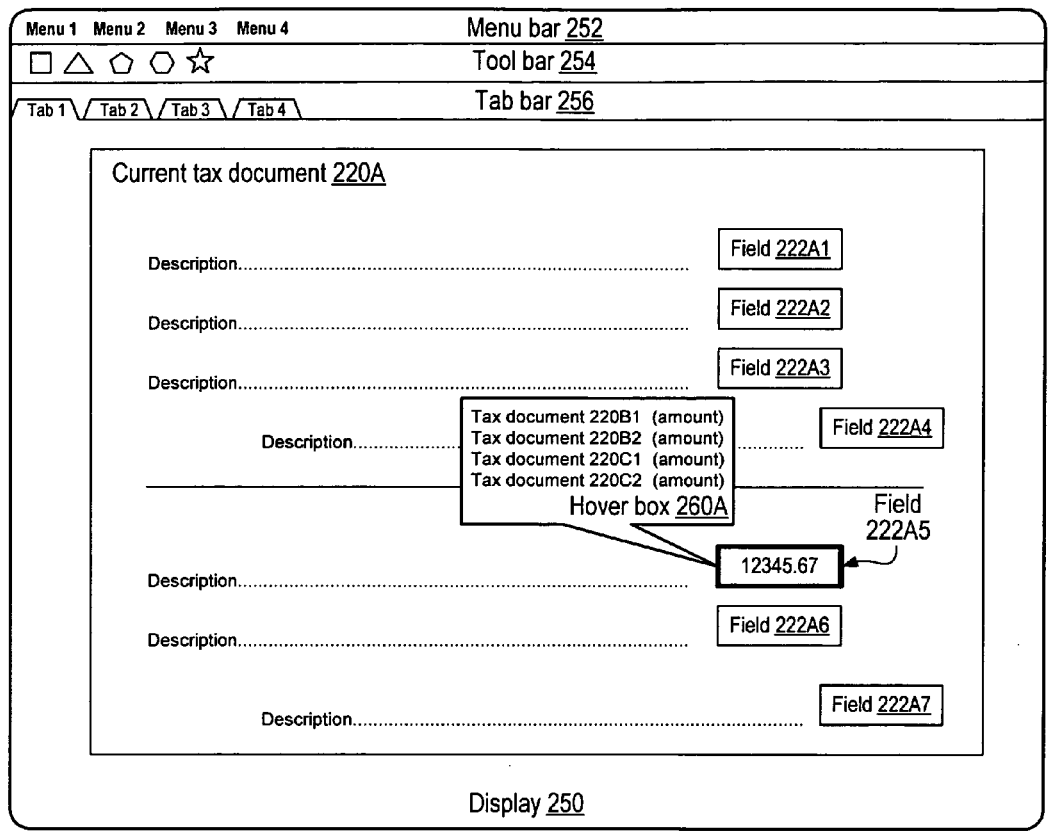

Once a field (e.g., field 222A5) is selected, tax program 200 may provide one or more user interface mechanisms and elements for invoking functionality to access and display source and/or destination information for the selected field 222A5. As an example, in one embodiment, "hovering" the cursor over a desired field, such as field 222A5, using a mouse or other cursor control device, may cause tax program 200 to access and display source and/or destination information for field 222A5 in a hover box or similar dialog, window, pane, view, or display. An exemplary hover box 260A for field 222A5 is illustrated in FIG. 3B. Note that, in various implementations, tax program 200 may provide one or more user interface mechanisms or elements whereby the functionality of hovering a cursor over a field to select and display source and/or destination information for the field may be turned off or on. For example, in one implementation a menu in menu bar 252 may be accessed by the user to select a menu item to toggle the mechanism on or off. One of ordinary skill in the art will recognize that various other user interface methods for toggling a feature in a program on or off may be used.

As an alternative to the hovering method described above, in one embodiment, a mouse or other cursor control device may have two buttons. In this embodiment, the preparer may right-click the mouse when the cursor is over the field 222A5 (note that the right-clicking of the cursor control device may also serve to select the field 222A5, as described above). In one embodiment, right-clicking on the field 222A5 may automatically cause the source and/or destination information for the field to be accessed and displayed. In one embodiment, right-clicking may cause a pop-up menu, or alternatively a dialog, to be displayed, from which the preparer may select from among one or more options. At least one of the options may be to display source and/or destination information for the selected field 222A5. As another alternative to the hovering mechanism described above, in one embodiment, once a field 222A5 is selected, a menu in menu bar 252 may be accessed by the preparer to select a menu item. In one embodiment, selecting the menu item may automatically cause the source and/or destination information for the field to be accessed and displayed. Alternatively, selecting the menu item may cause a pop-up menu, or alternatively a dialog, to be displayed, from which the preparer may select from among one or more options. At least one of the options may be to display source and/or destination information for the selected field 222A5. Similarly, in another embodiment, one or more of the tool icons in tool bar 254 may be configured to access and display source information for a selected field 222A5. One of ordinary skill in the art will recognize that various other user interface methods or combinations thereof may be used for invoking a feature of a program.

FIG. 3B illustrates an exemplary hover box that may be used to display source(s) and or destination(s) for a selected field on a current tax document according to one embodiment. Hover box 260A may be displayed, for example, in response to hovering the cursor over field 222A5, or alternatively in response to a right-click on the field 222A5. In one embodiment, hover box 260A may display information on one or more source documents 220B and/or one or more destination documents 220C for the value in the selected field 222A of the current tax document 220A. In addition to showing the source document(s) 220B and/or destination document(s) 220C, hover box 260A may display other information, such as how much of the value in the selected field 222A5 flows from each source document 220B, or how much of the value in the selected field 222A5 flows to each destination document 220C (the "amounts", in FIG. 3B). Instead of or in addition to displaying how much of the value in the selected field 222A5 flows from each source document 220B or to each destination document 220C, some embodiments may display information in hover box 260A identifying one or more particular fields of the source document(s) 220B from which the amount flows or one or more particular fields of the destination document(s) 220C to which the amount flows. For example, if a source document 220B is a Federal tax form Schedule C, instead of or in addition to displaying the amount, the line number from the Schedule from which the amount flows may be identified in hover box 260A. In one embodiment, a mechanism may be provided whereby user selection of an interface item representing a tax document 220 in hover box 260A may cause additional information for that document 220 to be displayed. In one embodiment, a mechanism may be provided whereby user selection of an interface item representing a tax document 220 in hover box 260A may cause at least a portion of the associated source document 220B or destination document 220C to be displayed.

Figure 3C:
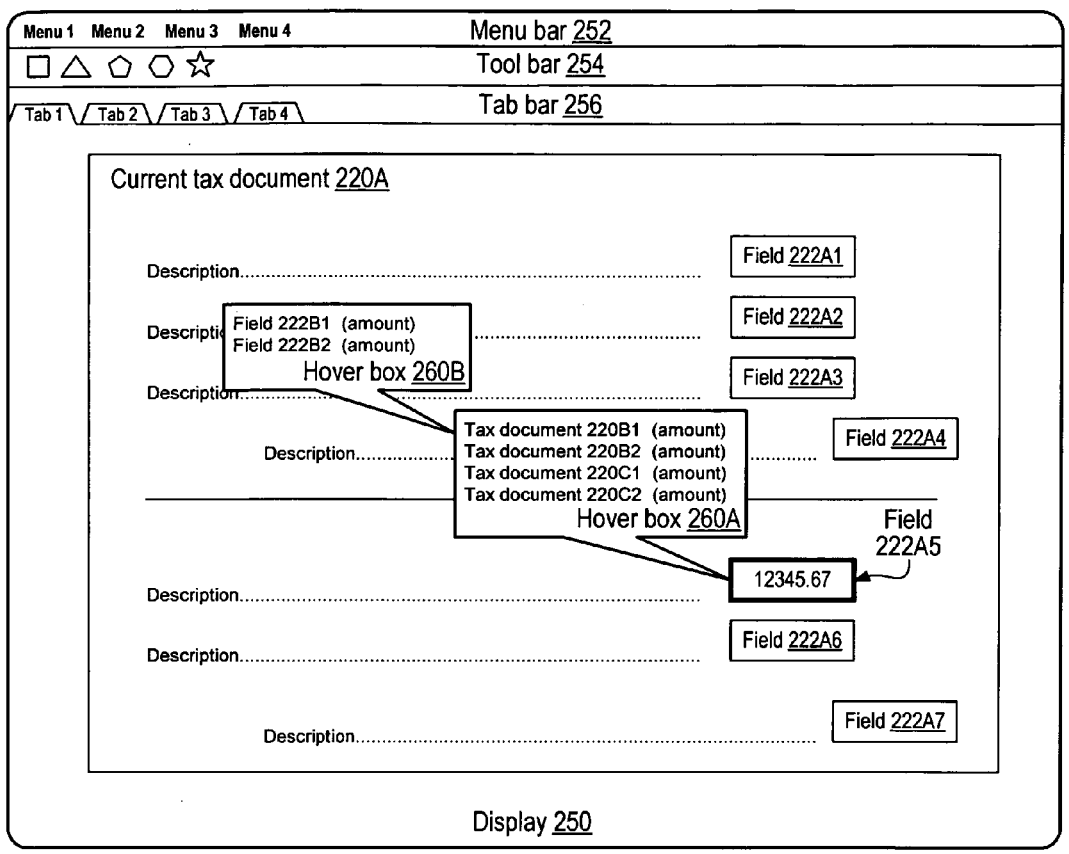
Figure 3D:
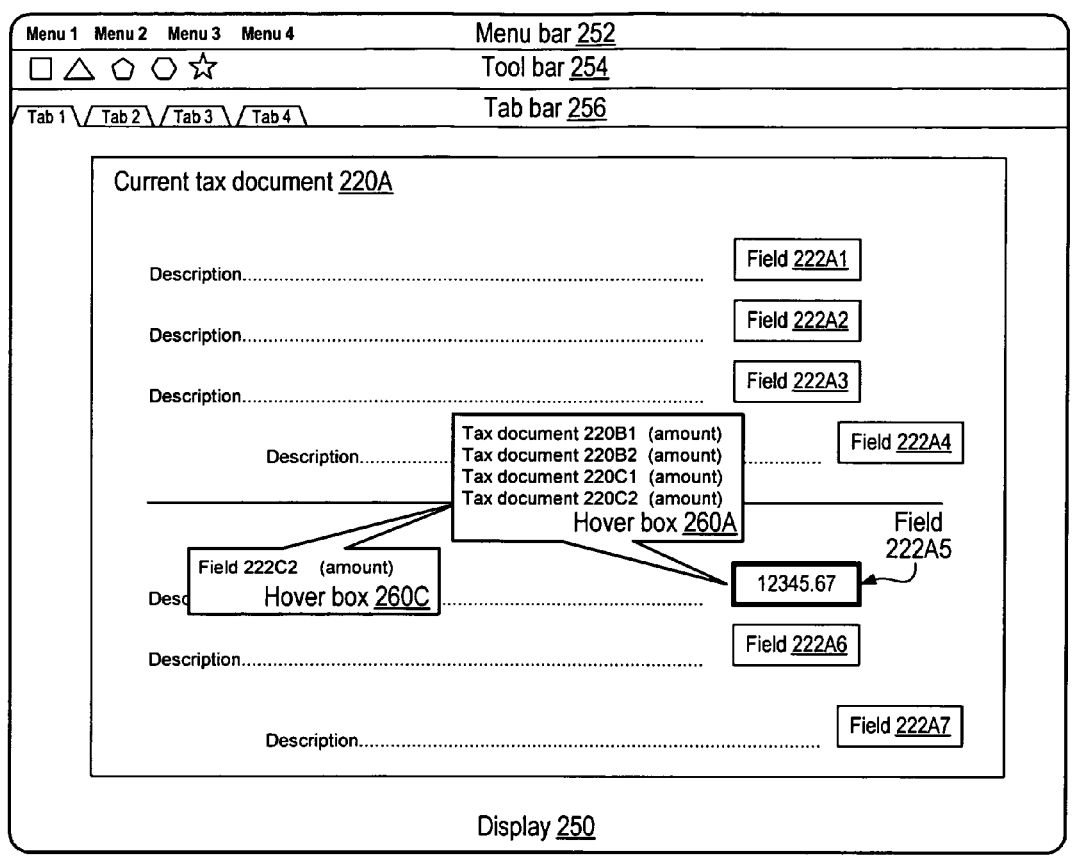

In one embodiment, hovering the cursor over or otherwise selecting an interface item representing a tax document 220 in hover box 260A may cause another hover box 260 or other user interface element to be displayed that includes additional information related to the selected document 220 as a source or destination for the value in selected field 222A5, as is illustrated in FIGS. 3C and 3D. In FIG. 3C, source tax document 220B1 has been selected, and a hover box 260B including additional information on data flow from the selected document 220B1 to field 222A5 is displayed in hover box 260B. The information presented in hover box 260B may include, but is not limited to, information describing the one or more fields 222B in document 220B1 that flow into field 222A5 (e.g., line numbers or other such labels), and the amounts from those fields 222B that flow into field 222A5. In FIG. 3D, destination tax document 220C2 has been selected, and a hover box 260C including additional information on data flow from field 222A5 to the selected document 220C2 is displayed in hover box 260C. The information presented in hover box 260C may include, but is not limited to, information describing the one or more fields 222C in document 220C2 into which field 222A5 flows, and the amounts from field 222A5 that flow into those fields 222B.

Some embodiments may provide a mechanism or mechanisms whereby a portion or all of a source document 220B and/or destination document 220C may be displayed from hover boxes 260A, 260B, and/or 260C. For example, in one embodiment, a user interface mechanism may be provided whereby a user may select an interface item representing a tax document 220 in hover box 260A and then select to display at least a portion of the selected tax document 220. For example, right-clicking an interface item representing a tax document 220 in hover box 260A may cause a popup menu or other user interface element to be displayed that includes a user-selectable item to display a portion or all of the selected tax document 220.

In one embodiment, hovering the cursor over or otherwise selecting an interface item representing a field 222 in a tax document 220 in hover box 260B of FIG. 3C and/or hover box 260C of FIG. 3D may cause another hover box 260 or other user interface element to be displayed that includes additional information related to the selected field 222. In one embodiment, another hover box similar to hover box 260A of FIG. 3B may be displayed that includes source document(s) 220B or destination document(s) 220C for the selected field 222 in the hover box 260, and the amounts from these documents that flow into the selected field 222 in the hover box 260. Further, in one embodiment, the document(s) 220 displayed in these other hover boxes may be user-selectable to display additional flow information for the document(s) 220, for example in additional hover boxes similar to hover boxes 260B and 260C that display information on fields in the documents 220. Thus, embodiments of the mechanism as described herein may be used to proceed from a selected field 222A in a current tax document 220A to view the flow of values through one or more source documents 220B into the field 222A, and/or to proceed from the selected field 222A in the current tax document 220A to view the flow of the value of the field 222A through one or more destination documents 220C.

Note that hover boxes 260A, 260B, and 260C are exemplary, and that other user interface mechanisms may be used to access and display the flow of information to and from fields 222A in a current tax document 220A in a tax program as described above for the exemplary hover boxes 260. Further note that the names of the tax documents and fields used in the hover boxes 260 are exemplary; in an implementation of a tax program, more detailed names may be provided for tax documents 220 (e.g., "Form Schedule C" as an example for tax forms, and "Data entry display X" for data entry displays) and for the fields 222 in tax documents 220.

Figure 4:
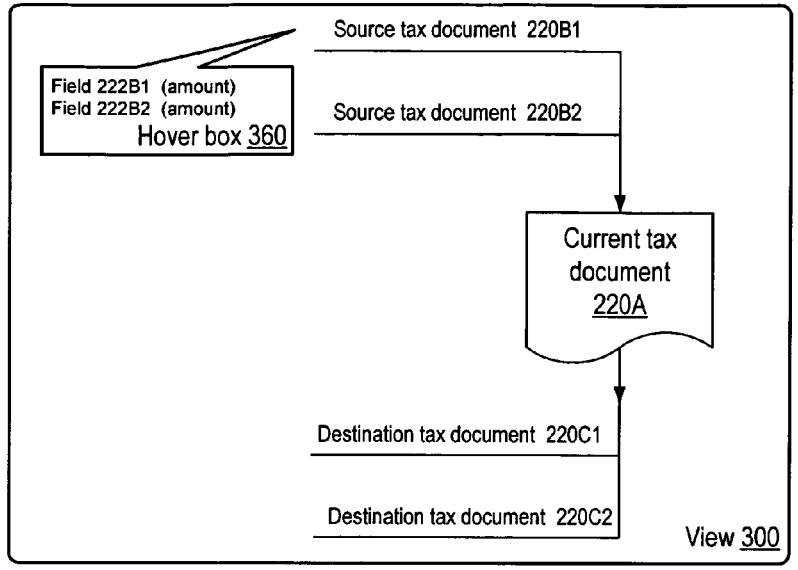
FIG. 4 illustrates an alternative and exemplary user interface mechanism for accessing and displaying the flow of information to and from a current tax document in a tax program according to one embodiment.
Figure 5:
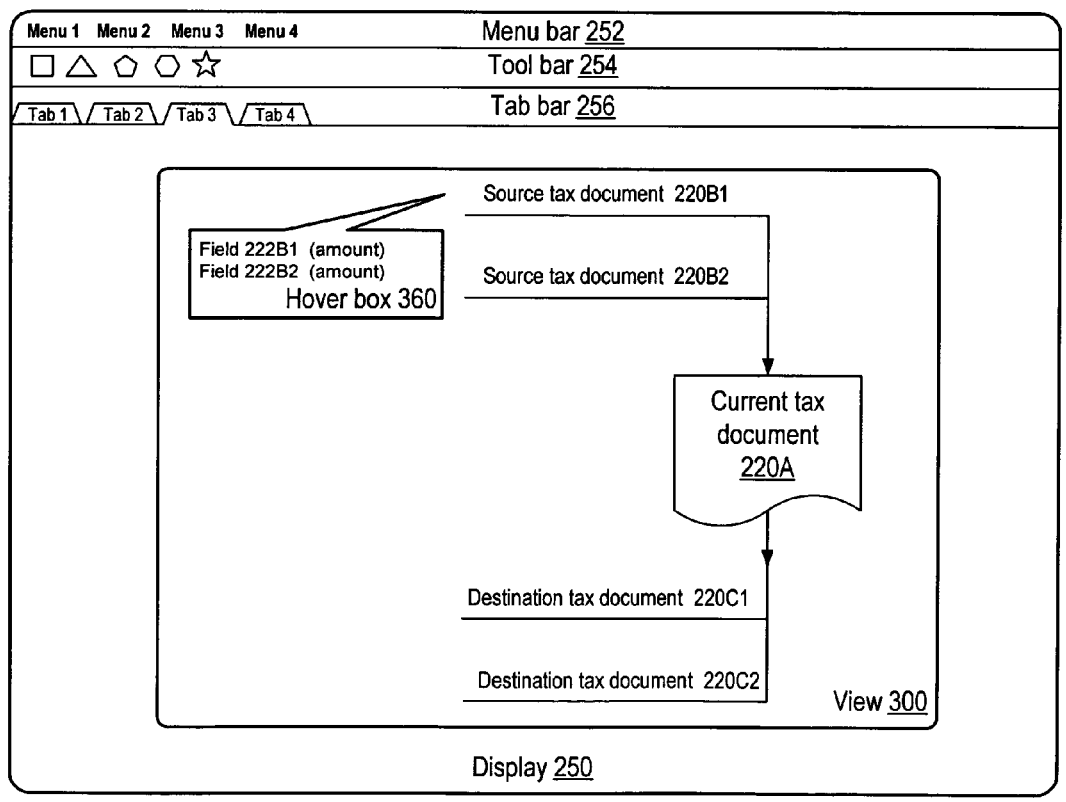
FIG. 5 illustrates the exemplary view of FIG. 4 presented in an exemplary display and user interface that may be provided by a tax program according to one embodiment.

FIGS. 3A through 3D illustrate an exemplary user interface mechanism for accessing and displaying the flow of information to and from fields 222A in a current tax document 220A in a tax program. Using this mechanism, a user may start at the level of a field in a document 220 to view other documents 220 and the flow of values among the documents related to that field. FIGS. 4 and 5 illustrate an alternative and exemplary user interface mechanism for accessing and displaying the flow of information to and from a current tax document in a tax program according to one embodiment. Note, however, that similar views 300 may be implemented for or accessing and displaying the flow of information to and from electronic documents in other types of financial return preparation programs.

In the mechanism as illustrated in FIG. 4, a graphical or textual representation of a current tax document 220A, for example a "thumbnail", may be displayed as a user interface item on a view 300 or other such user interface element. In addition, one or more user interface items may be displayed on view 300 as graphical or textual representations of one or more source tax documents 220B for document 220A, and one or more user interface items may be displayed on view 300 as graphical or textual representations of one or more destination tax documents 220C for document 220A. Note that, in one embodiment, a graphical representation similar to FIG. 2 may be displayed in view 300.

In one embodiment, hovering the cursor over or otherwise selecting an interface item representing a source tax document 220B or destination tax document 220C in view 300 may cause a hover box 360 or other user interface element to be displayed that includes additional information related to the selected document 220 as a source or destination for one or more values in document 220A. In FIG. 4, source tax document 220B1 has been selected, and a hover box 360 including additional information on data flow from the selected document 220B1 to document 220A is displayed in hover box 360. The information presented in hover box 360 may include, but is not limited to, information describing the one or more fields 222B in document 220B1 that flow into document 220A (e.g., line numbers or other such labels), and the amounts from those fields 222B that flow into document 220A. Note that a similar hover box 360 may be displayed when a destination tax document 220C is selected that displays information describing the one or more fields 222A in document 220A that flow into the destination tax document 220C, and the amounts from those fields 222A that flow into document 220C. Further note that, in one embodiment, user interface items representing fields 222 in hover box 360 may be user-selectable to display additional information for a selected field 222.

As previously mentioned, some implementations of tax programs may provide an input mechanism whereby the user inputs the necessary data and information into input fields on data entry displays presented to the user by the tax program. Data and information entered by the user via the input fields may then be automatically transferred into the appropriate locations on the tax return documents. In one embodiment, one of the graphical or textual user interface elements representing inputs to document 220A on view 300 may represent data entry displays. In one embodiment, selecting this element may cause to be displayed information describing one or more particular data entry displays from which information flows into current tax document 220A.

In one embodiment, a mechanism may be provided whereby a user may select one of the source tax documents 220B or destination tax documents 220C of current tax document 220A as a new current tax document 220A. In so doing, the view 300 would be automatically and appropriately adjusted to represent the newly selected current tax document 220A as the focus of the flow of information through the tax program 200. Note that various embodiments may include other graphical or textual user interface mechanisms for selecting a particular document 220 from a plurality of documents 220 in the tax program 200 as the current tax document 220A. For example, one implementation may include a menu or dialog box that graphically or textually list all documents 220, e.g. in alphanumeric order. View 300 may be invoked by a user for a selected one of the listed documents 220.

In one embodiment, view 300 illustrated in FIGS. 4 and 5 may be a section or portion of a master map presented graphically to the user, and on which the user, via provided user interface mechanisms, may zoom into or otherwise select a particular current tax document 220A as the target. In one embodiment, one or more user interface mechanisms may be provided whereby a user may pan around the map to view representations of the various electronic tax documents. Connections or relationships among the documents may be graphically displayed. Note that particular documents may only have certain other documents to which they are connected. Further note that, in preparing a particular return, certain documents/fields may be used, while other documents/fields may not be used. In other words, when calculations and transferals are done in the tax program for a particular return, data values may only flow through a portion of the documents/fields on the map. In one embodiment, for a particular tax return, the map may include indications of which documents and/or paths are involved in the transferal and/or calculation of values for fields (in other words, which documents are active, are part of the "flow"). For example, such active documents may be highlighted by displaying them in a different, color, texture, size, as bolded, as flashing, or a textual indication of which documents are "active" may be provided, or a combination of two or more highlighting methods may be sued. In one embodiment, paths between active documents may be similarly highlighted. In one embodiment, different active paths between documents may be differently highlighted to distinguish among the paths.

FIG. 5 illustrates the exemplary view 300 of FIG. 4 presented in an exemplary display and user interface that may be provided by a tax program according to one embodiment. Display 250 may include one or more of, but is not limited to, a menu bar 252, a tool bar 254, and a tab bar 256. Menu bar 252 may provide one or more menus for accessing various functionalities of tax program 200 via user-selectable interface items (menu selections). Tool bar 254 may provide one or more tool icons for accessing various tools of tax program 200. Tab bar 256 may provide one or more tabs for switching between various views presented to the tax preparer. In this example, the currently selected tab (Tab 3) displays view 300 that includes exemplary user interface mechanisms and elements for accessing and displaying the flow of information to and from a current tax document in a tax program.

While FIG. 5 shows that view 300 may be accessed via selection of a tab, one of ordinary skill in the art will recognize that various other user interface methods or combinations thereof may be used for invoking a feature of a program. As another example of a method for invoking the view 300 illustrated in FIG. 4, in one embodiment, a user may right-click or otherwise select a current tax document 220A on a display such as display 250 in FIG. 3A to access an option (e.g., a menu choice or some other user-selectable interface item) to display the source and/or destination document(s) for the current tax document 220A. Alternatively, a menu in menu bar 252 may include a menu item for invoking view 300 for a current tax document 220A, and/or an item in toolbar 254 may, when selected, invoke view 300 for a current tax document 220A.

In some embodiments, the various mechanisms described above for accessing and displaying the flow of information to and from a current tax document or to and from fields in a current tax document may also include one or more mechanisms for accessing and displaying associated help information, Frequently Asked Questions (FAQs), or other information (e.g., formulas used in calculations) related to a document 220 or field 222. For example, the hover boxes 260 illustrated in FIGS. 3B through 3D may include user-selectable interface items that, when selected, invoke the display of help or other information related to an associated document 220 or field 222. Note that this other information may be in graphical, textual, audio or video form, or a combination of two or more thereof.

In one embodiment, as an alternative to the mechanisms described in FIGS. 3A through 3D and in FIGS. 4 and 5, a mechanism that provides what may be described as a high-level "flow chart" approach to viewing the flow of information among electronic documents in a tax program may be provided. An exemplary user interface mechanism that may be used to implement such a method is illustrated in and described for FIGS. 6A through 6F and FIG. 7.

FIGS. 6A through 6F illustrate an exemplary tax summary view including exemplary user interface mechanisms and elements for accessing and displaying relationships among and information flow between tax documents in a tax return prepared by an implementation of a tax program according to one embodiment. Preparers or other users of a tax program may have difficulty tracing how values flow from electronic document to electronic document, and/or in how the entries that the preparer may have made into an electronic document (e.g., into a data entry display) flow into other documents (e.g., into the various forms and schedules of a current tax return).

FIGS. 6A through 6F illustrate a view 400 that may be used to present tax summary information as an outline flowchart that may be used to help users to better understand the relationships among the various electronic documents of a tax return, and the flow of values among those documents. FIGS. 6A through 6F illustrate a view 400 or other such user interface element that displays an exemplary income portion of a tax summary for "John and Jane Smith." Note that a similar view 400 may be provided for other portions of a tax summary/tax return, for example an expense portion. Further note that similar summary views 400 may be implemented for other types of financial return preparation programs.

Figure 6A:
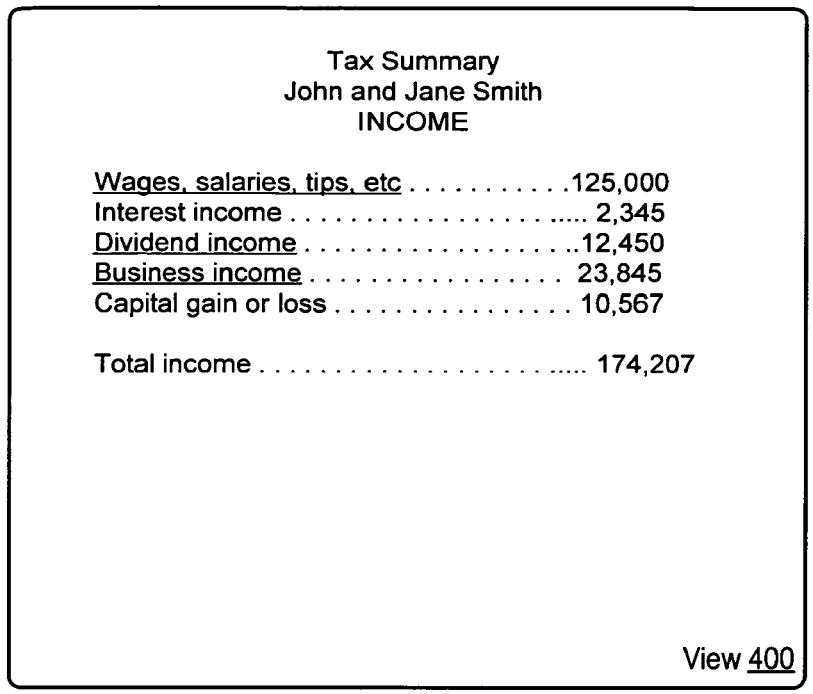

In FIG. 6A, an exemplary top-level tax summary in outline form for income is displayed in view 400. The line items of the exemplary income summary displayed in view 400 include Wages, salaries, tips, etc, Interest income, Dividend income, Business income, and Capital gain or loss. The associated values for the line items are also displayed. View 400 further includes a "total" line that indicates the total income.

One or more of the line items for which additional information is available may be configured as a user-selectable interface items that, when selected, cause to be displayed additional information about the line item in an expanded summary outline view 400 or otherwise displayed. In this example, these user-selectable items are shown as underlined. In this example, Wages, salaries, tips, etc, Dividend income, and Business income are underlined, and are thus indicated as user-selectable items.

Figure 6B:
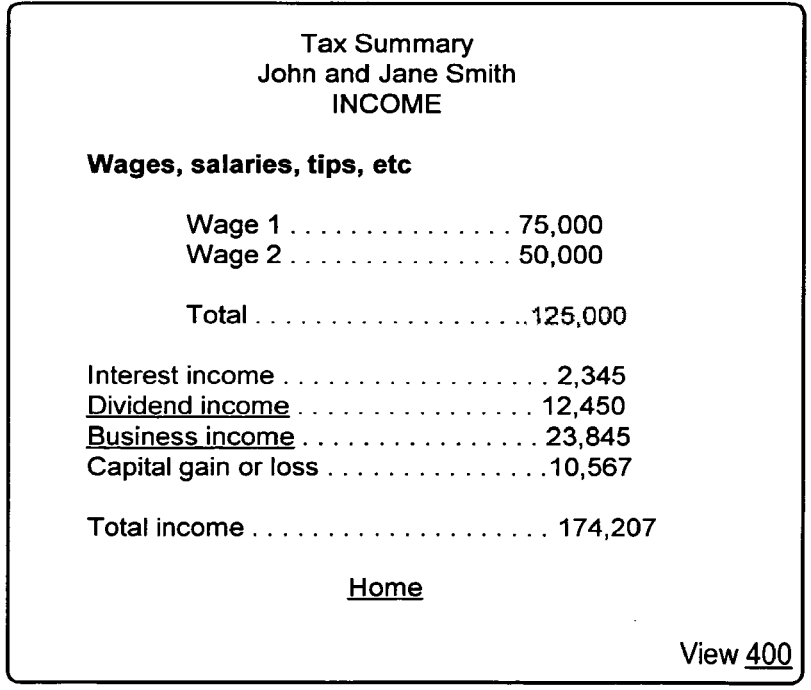

FIG. 6B illustrates an exemplary view 400 in which Wages, salaries, tips, etc. of FIG. 6A has been selected to display an expanded outline view including exemplary detail line items for wages, salaries, tips, etc. Note that one or more of the line items under the selected line item may also be configured as user-selectable interface items that, when selected, cause to be displayed additional information about the selected line item in an expanded summary outline view 400 or otherwise displayed. Note that view 400 of FIG. 6B also shows an exemplary Home user-selectable interface items that, when selected, may collapse view 400 to the top-level view or outline shown in FIG. 6A. Note that one or more other user interface items or mechanisms may be included for navigating a summary outline.

FIG. 6C illustrates an exemplary view 400 in which Dividend income of FIG. 6A has been selected to display an expanded outline view including exemplary detail line items for dividend income. Note that one or more of the line items under the selected line item may also be configured as user-selectable interface items that, when selected, cause to be displayed additional information about the selected line item in an expanded summary outline view 400 or otherwise displayed. Note that view 400 of FIG. 6C also shows an exemplary Home user-selectable interface items that, when selected, may collapse view 400 to the top-level view or outline shown in FIG. 6A. Note that one or more other user interface items or mechanisms may be included for navigating a summary outline.

FIG. 6D illustrates an exemplary view 400 in which Business income of FIG. 6A has been selected to display an expanded outline view including exemplary detail line items for business income. In this example, Business 1 and Business 2 are displayed, and may represent different businesses from which the total value for Business income is realized. Thus, each line item may display a value that is part of the total value for the summary item (e.g., Business income). Note that one or more of the line items under the selected line item may also be configured as user-selectable interface items that, when selected, cause to be displayed additional information about the selected line item, for example in an expanded summary outline view 400. In this example, Business 1 and Business 2 are underlined, and thus are indicated as user-selectable items for which additional information may be available. Note that view 400 of FIG. 6D also shows an exemplary Home user-selectable interface items that, when selected, may collapse view 400 to the top-level view or outline shown in FIG. 6A. Note that one or more other user interface items or mechanisms may be included for navigating a summary outline.

In one embodiment, selecting a user-selectable item in FIGS. 6A through 6F may cause to be displayed at least a portion of one or more associated electronic documents, or alternatively lists thereof. For example, selecting Business 1 in view 400 of FIG. 6D may cause to be displayed at least a portion of one or more associated electronic documents from which the value displayed for Business 1 ($12,225) is derived, such as a Federal tax form Schedule C (Form 1040) for Business 1. Alternatively, or in addition, selecting Business 1 may, as mentioned, display a list of one or more electronic documents associated with Business 1. FIG. 6E illustrates an exemplary view 400 in which Business income 1 of FIG. 6D has been selected to display an expanded outline view including exemplary detail line items (Tax document 1 and Tax document 2) for Business income 1. Note that the listed or displayed documents may include either or both of documents to which values flow (destination documents) or from which values flow (source documents) for the selected line item. Alternatively, a listed or displayed document may be a document (worksheet, data entry display, etc.) on which the value listed for the line item was calculated. Further note that, in one embodiment, the listed document(s) may be configured as user-selectable items that, when selected, display the associated electronic document.

In one embodiment, "hovering" the cursor over a desired value for a line item in view 400 of FIGS. 6A through 6E, such as the value "23,845" for Business income in FIG. 6A, using a mouse or other cursor control device, may cause the tax program to access and display additional information, e.g. source and/or destination information (documents and/or fields of documents) for the value, in a hover box or similar dialog, window, pane, view, or display. An exemplary hover box 460 for the value "23,845" for Business income in FIG. 6A is illustrated in FIG. 6F that shows two tax documents (Tax document 1 and Tax document 2) that may, for example, be sources for the selected value. Note that additional information (e.g., the amounts that flow into the value from the indicated documents) may also be displayed. In one embodiment, hovering the cursor over or otherwise selecting an interface item representing a tax document in hover box 460 may cause another hover box or other user interface element to be displayed that includes additional information related to the selected document as a source or destination for the value.

Note that alternative methods for invoking the display of additional information, and for displaying the additional information, are possible and contemplated. For example, as an alternative to the hovering method, in one embodiment, a mouse or other cursor control device may have two buttons. In this embodiment, the preparer may right-click the mouse when the cursor is over the value to invoke the display of additional information for the value, either directly or through interaction with a dialog box, menu, or other such user interface item displayed in response to the right-clicking.

In one embodiment, if an electronic tax document is displayed through interaction with a user interface item in the view 400 illustrated in FIGS. 6A though 6F, the user may then access one or more of the mechanisms illustrated in and described for FIGS. 3A through 3D and FIGS. 4 and 5, if desired, to find more detailed information on the flow of values among the documents.

The mechanisms and view 400 illustrated in FIGS. 6A through 6F may be used to present tax summary information as an outline flowchart, and may allow the user to proceed from the high-level information presented in the view 400 to particular documents and fields that are sources of information used to calculate particular values displayed in view 400, or alternatively destinations for the values.

FIG. 7 illustrates the exemplary tax summary view 400 of FIGS. 6A through 6F presented in an exemplary display and user interface that may be provided by a tax program according to one embodiment. Display 250 may include one or more of, but is not limited to, a menu bar 252, a tool bar 254, and a tab bar 256. Menu bar 252 may provide one or more menus for accessing various functionalities of tax program 200 via user-selectable interface items (menu selections). Tool bar 254 may provide one or more tool icons for accessing various tools of tax program 200. Tab bar 256 may provide one or more tabs for switching between various views presented to the tax preparer. In this example, the currently selected tab (Tab 4) displays view 400 that includes exemplary user interface mechanisms and elements for accessing and displaying relationships among tax documents in a tax program. While FIG. 7 shows that view 400 may be accessed via selection of a tab, one of ordinary skill in the art will recognize that various other user interface methods or combinations thereof may be used for invoking a feature of a program.

In one embodiment, the summary outline view mechanism described in FIGS. 6A through 6F and FIG. 7 may be integrated with one or more of the other mechanisms for displaying flow information through electronic documents as previously described. For example, from an electronic document displayed via selection of a user interface item in view 400 of FIGS. 6A through 6F, an embodiment of the mechanism described in FIGS. 3A-3D FIG. 4, and/or an embodiment of the mechanism described in FIGS. 4 and 5, may be invoked. Thus, embodiments may provide two or more integrated mechanisms for accessing and displaying different views of information related to information flow and relationships among electronic tax documents presented by tax preparation software programs. Some embodiments may provide options and user interface mechanisms for users to switch between multiple available views of information related to information flow and relationships among electronic tax documents if desired.

Note that, while it is not described above, a tax program may maintain or include a database or other data source in which the various relationships and information flows among the various electronic tax documents in a tax return is stored in some form, or alternatively from which the various relationships and information flows among the various electronic tax documents in a tax return is derivable. This data source may be used in or leveraged by embodiments to assist in providing the various displays of flow- and relationship-related information as described herein.

Figure 8A:
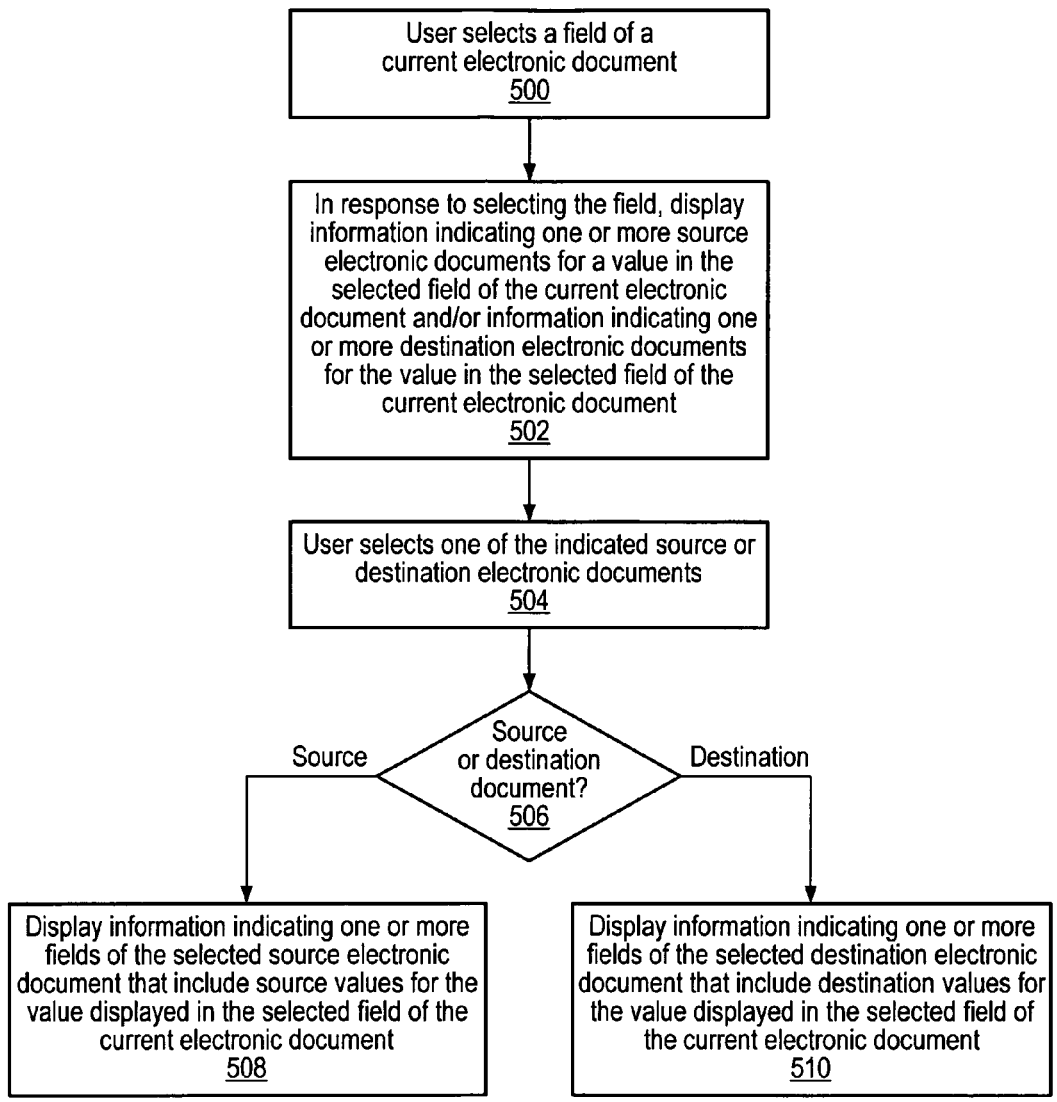
FIGS. 8A and 8B are flowcharts of a method for accessing and displaying the flow of information to and from electronic tax documents in a tax preparation program according to one embodiment.
Figure 8B:
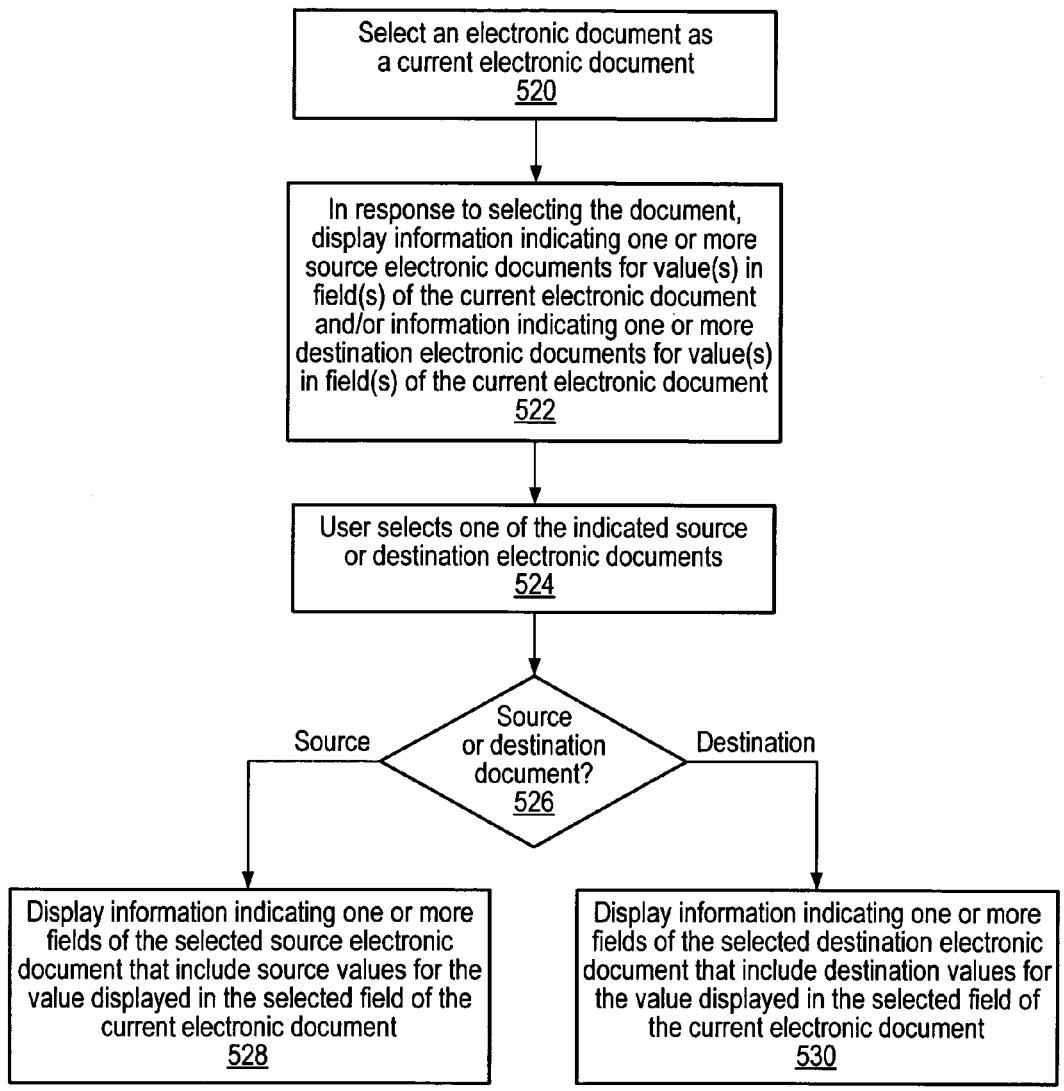

FIGS. 8A and 8B are flowcharts of a method for accessing and displaying the flow of information to and from electronic documents according to one embodiment. The methods in the two flowcharts are similar, and both may be implemented in a tax program or other financial return preparation program. Note that the primary difference is that FIG. 8A starts at selecting a field on a current electronic document, while FIG. 8B starts at select a current electronic document.

In FIG. 8A, a user selects a field of a current electronic document, as indicated at 500. An exemplary user interface and method for selecting a field of a current electronic document are illustrated in and described for FIGS. 3A through 3D. Note, however, that other user interfaces and methods may be used to select a field in a current electronic document. As indicated at 502, in response to selecting the field, information indicating one or more source electronic documents for a value in the selected field of the current electronic document and/or information indicating one or more destination electronic documents for the value in the selected field of the current electronic document may be displayed. Again, an exemplary user interface and method for displaying information indicating source and/or destination electronic documents of a field in a current electronic document are illustrated in and described for FIGS. 3A through 3D.

As indicated at 504, a user may select one of the indicated source or destination electronic documents. Again, an exemplary user interface and method for selecting from among indicated source and/or destination electronic documents of a field in a current electronic document are illustrated in and described for FIGS. 3A through 3D. Note, however, that other user interfaces and methods may be used to select from among indicated source and/or destination electronic documents.

At 506, if the selected electronic document is a source electronic document for the selected field of the current electronic document, information indicating one or more fields of the selected source electronic document that include source values for the value displayed in the selected field of the current electronic document may be displayed, as indicated at 508. Again, an exemplary user interface and method for displaying information indicating fields that include source values for a value displayed in a selected field of a current electronic document are illustrated in and described for FIGS. 3A through 3D.

At 506, if the selected electronic document is a destination electronic document for the selected field of the current electronic document, information indicating one or more fields of the selected destination electronic document that include destination values for the value displayed in the selected field of the current electronic document may be displayed, as indicated at 510. Again, an exemplary user interface and method for displaying information indicating fields that are destinations for a value displayed in a selected field of a current electronic document are illustrated in and described for FIGS. 3A through 3D.

In FIG. 8B, an electronic document is selected as a current electronic document, for example via user input to a user interface of a tax program, as indicated at 520. Exemplary user interfaces and methods for selecting an electronic document as a current electronic document are illustrated in and described for FIG. 4 and FIG. 5, FIGS. 6A through 6F, and FIG. 7. Note, however, that other user interfaces and methods may be used to select a current electronic document. As indicated at 522, in response to selecting the document (or, alternatively, in response to some other event, such as some other user interaction with a user interface of a tax program), information indicating one or more source electronic documents for value(s) in field(s) of the current electronic document and/or information indicating one or more destination electronic documents for value(s) in field(s) of the current electronic document may be displayed.

As indicated at 524, a user may select one of the indicated source or destination electronic documents. Exemplary user interfaces and methods for selecting from among indicated source and/or destination electronic documents of a field in a current electronic document are illustrated in and described for FIGS. 3A through 3D and for FIG. 4 and FIG. 5. Note, however, that other user interfaces and methods may be used to select from among indicated source and/or destination electronic documents.

At 526, if the selected electronic document is a source electronic document for the current electronic document, information indicating one or more fields of the selected source electronic document that include source values for the value displayed in the selected field of the current electronic document may be displayed, as indicated at 528. Again, an exemplary user interface and method for displaying information indicating fields that include source values for a current electronic document are illustrated in and described for FIGS. 4 and 5.

At 526, if the selected electronic document is a destination electronic document for the current electronic document, information indicating one or more fields of the selected destination electronic document that include destination values for values in the current electronic document may be displayed, as indicated at 530. Again, an exemplary user interface and method for displaying information indicating fields that are destinations for values of a current electronic document are illustrated in and described for FIGS. 4 and 5.

Exemplary System

Figure 9:
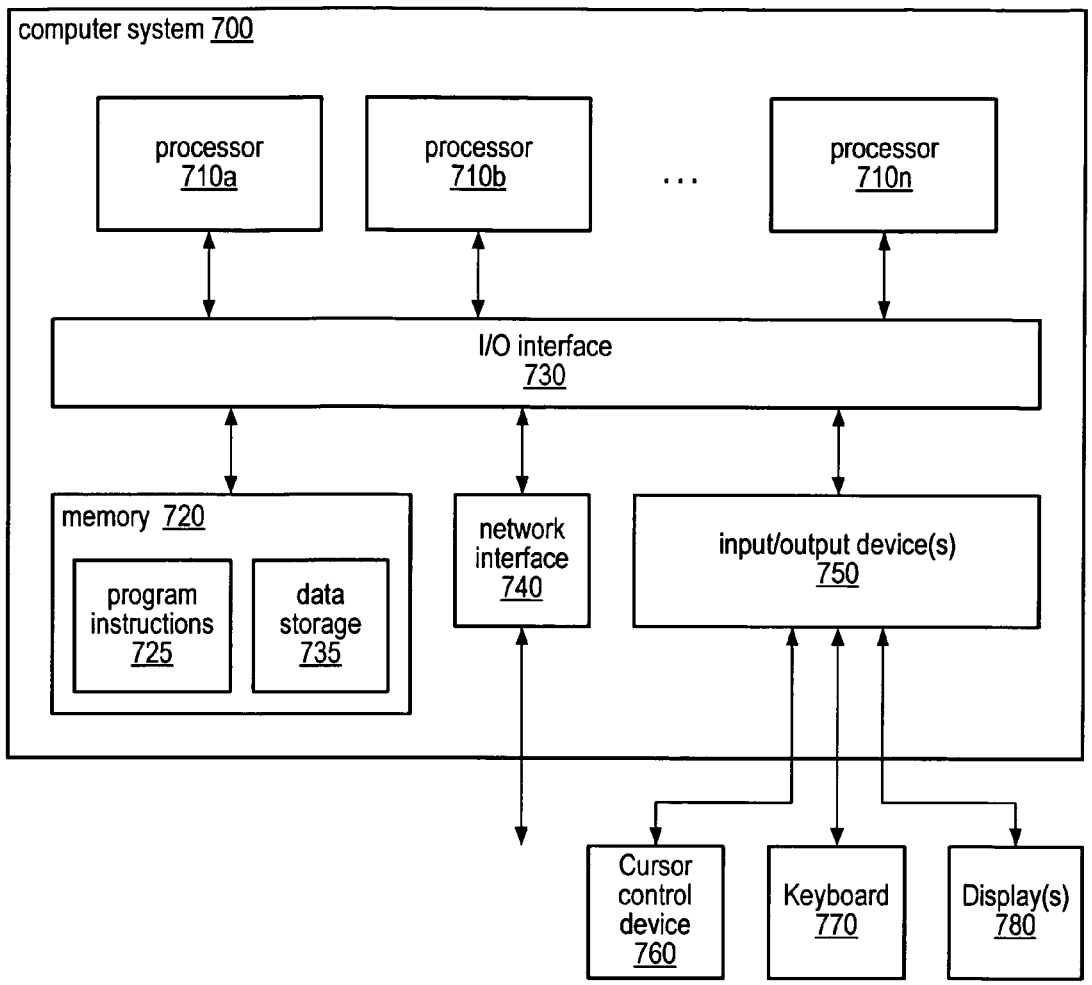
FIG. 9 illustrates an exemplary computer system on which embodiments may be implemented.

Various embodiments of a system and method for accessing and displaying information related to information flow and relationships among various electronic tax documents presented by tax preparation software programs or other types of financial return preparation programs, as described herein, may be executed on one or more computer systems, which may interact with various other devices. One such computer system is illustrated by FIG. 9. In the illustrated embodiment, computer system 700 includes one or more processors 710 coupled to a system memory 720 via an input/output (I/O) interface 730. Computer system 700 further includes a network interface 740 coupled to I/O interface 730, and one or more input/output devices 750, such as cursor control device 760, keyboard 770, and display(s) 780. In some embodiments, it is contemplated that embodiments may be implemented using a single instance of computer system 700, while in other embodiments multiple such systems, or multiple nodes making up computer system 700, may be configured to host different portions or instances of embodiments. For example, in one embodiment some elements may be implemented via one or more nodes of computer system 700 that are distinct from those nodes implementing other elements.

In various embodiments, computer system 700 may be a uniprocessor system including one processor 710, or a multiprocessor system including several processors 710 (e.g., two, four, eight, or another suitable number). Processors 710 may be any suitable processor capable of executing instructions. For example, in various embodiments processors 710 may be general-purpose or embedded processors implementing any of a variety of instruction set architectures (ISAs), such as the x86, PowerPC, SPARC, or MIPS ISAs, or any other suitable ISA. In multiprocessor systems, each of processors 710 may commonly, but not necessarily, implement the same ISA.

System memory 720 may be configured to store program instructions and/or data accessible by processor 710. In various embodiments, system memory 720 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above, are shown stored within system memory 720 as program instructions 725 and data storage 735, respectively. In other embodiments, program instructions and/or data may be received, sent or stored upon different types of computer-accessible media or on similar media separate from system memory 720 or computer system 700. Generally speaking, a computer-accessible medium may include storage media or memory media such as magnetic or optical media, e.g., disk or CD/DVD-ROM coupled to computer system 700 via I/O interface 730. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 740.

In one embodiment, I/O interface 730 may be configured to coordinate I/O traffic between processor 710, system memory 720, and any peripheral devices in the device, including network interface 740 or other peripheral interfaces, such as input/output devices 750. In some embodiments, I/O interface 730 may perform any necessary protocol, timing or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. In some embodiments some or all of the functionality of I/O interface 730, such as an interface to system memory 720, may be incorporated directly into processor 710.

Network interface 740 may be configured to allow data to be exchanged between computer system 700 and other devices attached to a network, such as other computer systems, or between nodes of computer system 700. In various embodiments, network interface 740 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 750 may, in some embodiments, include one or more display terminals, keyboards, keypads, touchpads, scanning devices, voice or optical recognition devices, or any other devices suitable for entering or retrieving data by one or more computer system 700. Multiple input/output devices 750 may be present in computer system 700 or may be distributed on various nodes of computer system 700. In some embodiments, similar input/output devices may be separate from computer system 700 and may interact with one or more nodes of computer system 700 through a wired or wireless connection, such as over network interface 740.

As shown in FIG. 9, memory 720 may include program instructions 725, configured to implement embodiments of a system and method for accessing and displaying information related to information flow and relationships among various electronic tax documents presented by tax preparation software programs or other types of financial return preparation programs as described herein, and data storage 735, comprising various documents, tables, databases, etc. accessible by program instructions 725. In one embodiment, program instructions 725 may include software elements illustrated in the Figures (e.g., current tax program 200 in FIG. 1) and data storage 735 may include data illustrated in the Figures (e.g., previous tax return information, current tax document(s) 220 when and if stored, etc.). In other embodiments, different software elements and data may be included.

Those skilled in the art will appreciate that computer system 700 is merely illustrative and is not intended to limit the scope of the present invention. In particular, the computer system and devices may include any combination of hardware or software that can perform the indicated functions, including computers, network devices, internet appliances, PDAs, wireless phones, pagers, etc. Computer system 700 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 700 may be transmitted to computer system 700 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc. As well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A computer-implemented method comprising:
    displaying, using a processor, a current tax form having a first current field populated with a first current numerical value;
    receiving, using the processor, a selection of the first current field;
    identifying, using the processor and in response to receiving the selection of the first current field, a first source tax form having a first source field populated with a first source numerical value;
    identifying, using the processor and in response to receiving the selection of the first current field, a second source tax form having a second source field populated with a second source numerical value,
    wherein the first current numerical value is calculated based on the first source numerical value and the second source numerical value; and
    simultaneously displaying, using the processor, the current tax form with a hover box comprising a title of the first source tax form and a title of the second source tax form, wherein the current tax form, the first source tax form, and the second source tax form are tax forms in a single financial return.

2. The method of claim 1, further comprising:
    displaying, within the hover box, the first source numerical value and the second source numerical value.

3. The method of claim 2, further comprising:
    receiving a selection of the first source numerical value in the hover box; and
    simultaneously displaying, in response to receiving the selection of the first source numerical value, the current tax form and the hover box with a nested hover box comprising an identifier of the first source field.

4. The method of claim 1, further comprising:
    receiving a selection of a second current field in the current tax form, wherein the second current field is populated with a second current numerical value;
    identifying, in response to receiving the selection of the second current field, a destination tax form having a destination field populated with a destination numerical value, wherein the destination numerical value is calculated based on the second current numerical value; and
    simultaneously displaying a title of the destination tax form with the current tax form.

5. The method of claim 4, further comprising: simultaneously displaying the destination numerical value with the current tax form.

6. A system comprising:
    a processor;
    a display device; and a memory coupled to the processor, wherein the memory comprises program instructions executable by the processor to:
  display a current tax form having a first current field populated with a first current numerical value;
  receive a selection of the first current field;
  identify, in response to receiving the selection of the first current field, a first source tax form having a first source field populated with a first source numerical value;
  identify, in response to receiving the selection of the first current field, a second source tax form having a second source field populated with a second source numerical value,
  wherein the first current numerical value is calculated based on the first source numerical value and the second source numerical value; and
  simultaneously display, on the display device, the current tax form with a hover box comprising a title of the first source tax form and a title of the second source tax form, wherein the current tax form, the first source tax form, and the second source tax form are tax forms in a single financial return.

7. The system of claim 6, wherein the program instructions are further executable by the processor to:
  display, on the display device and within the hover box, the first source numerical value and the second source numerical value.

8. The system of claim 7, wherein the program instructions are further executable by the processor to:
  receive a selection of the first source numerical value in the hover box; and
  simultaneously display, on the display device and in response to receiving the selection of the first source numerical value, the current tax form and the hover box with a nested hover box comprising an identifier of the first source field.

9. The system of claim 6, wherein the program instructions are further executable by the processor to:
  receive a selection of a second current field in the current tax form, wherein the second current field is populated with a second current numerical value;
  identify, in response to receiving the selection of the second current field, a destination tax form having a destination field populated with a destination numerical value, wherein the destination numerical value is calculated based on the second current numerical value; and
  display on the display device a title of the destination tax form with the current tax form.

10. The system of claim 9, wherein the program instructions are further executable by the processor to:
  simultaneously display on the display device the destination value with the current tax form.

11. A computer readable storage medium, comprising program instructions, wherein the program instructions are computer-executable to implement:
  displaying a current tax form having a first current field populated with a first current numerical value;
  receiving a selection of the first current field;
  identifying, in response to receiving the selection of the first current field, a first source tax form having a first source field populated with a first source numerical value;
  identifying, in response to receiving the selection of the first current field, a second source tax form having a second source field populated with a second source numerical value,
  wherein the first current numerical value is calculated based on the first source numerical value and the second source numerical value; and
  simultaneously displaying the current tax form with a hover box comprising a title of the first source tax form and a title of the second source tax form, wherein the current tax form, the first source tax form, and the second source tax form are tax forms in a single financial return.

12. The computer readable storage medium of claim 11, wherein the program instructions are further computer-executable to implement:
  displaying, within the hover box, the first source numerical value and the second source numerical value.

13. The computer readable storage medium of claim 12, wherein the program instructions are further computer-executable to implement:
  receiving a selection of the first source numerical value in the hover box; and
  simultaneously displaying, in response to receiving the selection of the first source numerical value, the current tax form and the hover box with a nested hover box comprising an identifier of the first source field.

14. The computer readable storage medium of claim 11, wherein the program instructions are further computer-executable to implement:
  receiving a selection of a second current field in the current tax form, wherein the second current field is populated with a second current numerical value;
  identifying, in response to the selection of the second current field, a destination tax form having a destination field populated with a destination numerical value, wherein the destination numerical value is calculated based on the second current numerical value; and
  simultaneously displaying a title of the destination tax form with the current tax form.

15. The computer readable storage medium of claim 14, wherein the program instructions are further computer-executable to implement:
  simultaneously displaying the destination numerical value with the current tax form.

16. A computer-implemented method comprising:
  displaying, using a processor, a map comprising a representation of a current tax form, wherein the current tax form comprises a current field populated with a current numerical value;
  receiving, using the processor, a selection of the representation of the current tax form;
  identifying, using the processor and in response to receiving the selection of the representation, a first source tax form comprising a first source field populated with a first source numerical value;
  identifying, using the processor and in response to receiving the selection of the representation, a second source tax form having a second source field populated with a second source numerical value,
  wherein the current numerical value is calculated based on the first source numerical value and the second source numerical value; and
  simultaneously displaying, using the processor and within the map, the representation of the current tax form, a title of the first source tax form and a title of the second source tax form, wherein the current tax form, the first source tax form, and the second source tax form are tax forms in a single financial return.

17. The method of claim 16, further comprising:
  identifying a destination tax form comprising a destination field populated with a destination numerical value, wherein the destination numerical value is calculated based on a second current numerical value of the current tax form; and simultaneously displaying, within the map, the representation of the current tax form and a title of the destination tax form.

18. A system comprising:

a processor;

a display device; and a memory coupled to the processor, wherein the memory comprises program instructions executable by the processor to:

display on the display device a map comprising a representation of a current tax form, wherein the current tax form comprises a current field populated with a current numerical value;

receive a selection of the representation;

identify, in response to receiving the selection of the representation, a first source tax form comprising a first source field populated with a first source numerical value;

identify, in response to receiving the selection of the representation, a second source tax form having a second source field populated with a second source numerical value, wherein the current numerical value is calculated based on the first source numerical value and the second source numerical value; and simultaneously display, on the display device and within the map, the representation of the current tax form, a title of the first source tax form and a title of the second source tax form, wherein the current tax form, the first source tax form, and the second source tax form are tax forms in a single financial return.

19. The system of claim 18, wherein the program instructions are further executable by the processor to:

identify a destination tax form comprising a destination field populated with a destination numerical value, wherein the destination numerical value is calculated based on a second current numerical value of the current tax form; and simultaneously display, on the display device and within the map, the representation of the current tax form and a title of the destination tax form.

20. A computer readable storage medium, comprising program instructions, wherein the program instructions are computer-executable to implement:

displaying a map comprising a representation of a current tax form, wherein the current tax form comprises a current field populated with a current numerical value;

receiving a selection of the representation;

identifying, in response to receiving the selection of the representation, a first source tax form comprising a first source field populated with a first source numerical value;

identifying, in response to receiving the selection of the representation, a second source tax form having a second source field populated with a second source numerical value, wherein the current numerical value is calculated based on the first source numerical value and the second source numerical value; and simultaneously displaying, within the map, the representation of the current tax form, a title of the first source tax form and a title of the second source tax form, wherein the current tax form, the first source tax form, and the second source tax form are tax forms in a single financial return.

21. The computer readable storage medium of claim 20, wherein the program instructions are further computer-executable to implement:

identifying a destination tax form comprising a destination field populated with a destination numerical value, wherein the destination numerical value is calculated based on a second current numerical value of the current tax form; and simultaneously displaying, within the map, the representation of the current tax form and a title of the destination tax form.

\* \* \* \* \*